(12) United States Patent
Kibune

(10) Patent No.: US 8,798,568 B2
(45) Date of Patent: Aug. 5, 2014

(54) SIGNAL TRANSMISSION METHOD, TRANSMISSION CIRCUIT AND APPARATUS

(75) Inventor: Masaya Kibune, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 594 days.

(21) Appl. No.: 12/562,712

(22) Filed: Sep. 18, 2009

(65) Prior Publication Data

US 2010/0039188 A1     Feb. 18, 2010

Related U.S. Application Data

(63) Continuation of application No. PCT/JP2007/055966, filed on Mar. 23, 2007.

(51) Int. Cl.
*H04B 1/18*     (2006.01)

(52) U.S. Cl.
USPC .............. 455/282; 455/296; 333/25; 333/26; 333/139; 333/32; 333/33

(58) Field of Classification Search
USPC .................. 455/296; 333/25, 26, 139, 32, 33
See application file for complete search history.

(56) References Cited

U.S. PATENT DOCUMENTS

| | | | | |
|---|---|---|---|---|
| 5,043,671 | A | * | 8/1991 | Tran .............................. 315/505 |
| 6,020,795 | A | * | 2/2000 | Kim ................................ 333/33 |
| 6,678,317 | B1 | | 1/2004 | Murakami et al. |
| 6,694,017 | B1 | * | 2/2004 | Takada .......................... 379/402 |
| 6,867,600 | B1 | * | 3/2005 | Iskanius et al. ............... 324/646 |
| 7,454,001 | B2 | * | 11/2008 | Hundal et al. ........... 379/142.08 |
| 2005/0265530 | A1 | * | 12/2005 | Hundal et al. ........... 379/142.01 |
| 2010/0159851 | A1 | * | 6/2010 | Endo et al. ....................... 455/78 |

FOREIGN PATENT DOCUMENTS

| | | |
|---|---|---|
| JP | 2000-078060 A | 3/2000 |
| JP | 2004-363861 A | 12/2004 |
| JP | 2005-311419 A | 11/2005 |
| JP | 2007-028155 A | 2/2007 |
| WO | WO 2007/032079 A1 | 3/2007 |

* cited by examiner

*Primary Examiner* — Temesgh Ghebretinsae
*Assistant Examiner* — Richard Chan
(74) *Attorney, Agent, or Firm* — Arent Fox LLP

(57) ABSTRACT

A signal transmission method suppresses a reflected wave of a transmission signal on a transmission line, by obtaining level and time information related to the reflected wave by computing a correlation between a data pattern of the transmission signal and the reflected wave, and correcting a waveform of the transmission signal based on the level and time information related to the reflected wave.

20 Claims, 22 Drawing Sheets

SIGNAL TRANSMISSION METHOD, TRANSMISSION CIRCUIT AND APPARATUS

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2007/055966 filed on Mar. 23, 2007, in the Japanese Patent Office, the disclosure of which is hereby incorporated by reference.

FIELD

The present embodiment discussed herein generally relates to signal transmission methods, transmission and/or reception circuits (hereinafter simply referred to as transmission/reception circuits), and apparatuses having such a transmission/reception circuit, and to a signal transmission method, a transmission/reception circuit, and an apparatus having such a transmission/reception circuit for use in signal transmissions among a plurality of circuit blocks within a semiconductor device (or semiconductor chip), signal transmissions among semiconductor chips (or Large Scale Integrated circuit (LSI) chips), signal transmissions among boards or housings (or casings) mounted on the semiconductor chip, and the like.

BACKGROUND

When an output impedance of a transmission circuit or an input impedance of a reception circuit and a characteristic impedance of a transmission line are mismatched, a signal reflection occurs due to the impedance mismatch. This signal reflection causes a distortion (or deterioration) in the signal waveform on the transmission line, and increases the error rate of the signals that are transmitted.

For this reason, in high-speed signal transmission systems, the connection format has changed from the multi-drop bus connection which easily generates the impedance mismatch to the point-to-point connection which provides appropriate termination. However, in signal transmission systems which operate at even high speeds, the impedance mismatch is generated due to the signal transmission lines on the LSI package or board, through holes, connectors and the like, and the signal waveform is deteriorated by the signal reflection caused by the impedance mismatch. On the other hand, if an attempt is made to suppress the impedance mismatch by improving the fabrication accuracy of the signal transmission lines on the LSI package or board, through holes, connectors and the like, both the number of fabrication stages and the fabrication cost will increase.

Accordingly, in high-speed signal transmission systems, there are demands to reduce the effects of the signal reflection caused by the impedance mismatch by a relatively simple solution.

A Japanese Laid-Open Patent Publication No. 2004-363861 proposes an example of a signal transmission system which reduces the effects of the signal reflection caused by the impedance mismatch. A transmitting end circuit block includes a level monitor circuit to detect an intensity of the reflected wave. Information related to the reflected wave is extracted and sent to a receiving end circuit block via a signal wiring provided separately from a main signal wiring, and a waveform-shaping (or reshaping) is performed by subtracting the reflected wave component from the received signal in the receiving end circuit block. Alternatively, instead of subtracting the reflected wave component from the receiving signal in the receiving end circuit block, the reflected wave component is subtracted in advance from the transmitting signal in the transmitting end circuit block. The information related to the reflected wave is extracted by sending a unit pulse from the transmitting end circuit block prior to sending the transmitting signal, and detecting the reflected wave of the unit pulse by the transmitting end circuit block.

The circuit construction becomes complex and the circuit scale becomes large if a timer circuit and the level monitor circuit are formed using an Analog-to-Digital Converter (ADC) as proposed in the Japanese Laid-Open Patent Publication No. 2004-363861. Because the timer circuit and the level monitor circuit are connected to an output side of the transmitting end circuit block, an impedance mismatch is generated due to input capacitances of the timer circuit and the level monitor circuit, to thereby not only increase the reflection but also deteriorate the signal band. Particularly, in the case of the high-speed signals of 1 Gbps or higher, for example, the level monitor circuit required in the Japanese Laid-Open Patent Publication No. 2004-363861 is a flash type ADS which has an extremely large input capacitance that is proportional to $2^{N-1}$ if the number of output bits of the ADC is N.

In the Japanese Laid-Open Patent Publication No. 2004-363861, the information related to the reflected wave is extracted by sending the unit pulse from the transmitting end circuit block prior to sending the transmission signal and detecting the reflected wave of the unit pulse by the receiving end circuit block. For this reason, the reflected wave component may not be extracted while sending the transmitting signal from the transmitting end circuit block or, while receiving the signal by the receiving end circuit block. Accordingly, with respect to a dynamic change of the transmission line, such as a temperature change and deterioration with time (or aging), it is impossible to always perform the extraction of the reflected wave component, the transmission of the reflected wave or, the subtraction from the received signal in an optimum manner.

SUMMARY

Accordingly, it is an object in one aspect to provide a signal transmission method, a transmission/reception circuit, and an apparatus having such a transmission/reception circuit which may reduce signal waveform deterioration caused by the reflected wave due to an impedance mismatch even with respect to a dynamic change in a transmission line, and reduce an error rate of the transmitted signal.

One aspect is to provide a signal transmission method for suppressing a reflected wave of a transmission signal on a transmission line, comprising obtaining level and time information related to the reflected wave by computing a correlation between a data pattern of the transmission signal and the reflected wave; and correcting a waveform of the transmission signal based on the level and time information related to the reflected wave.

One aspect is to provide a signal transmission/reception circuit for suppressing a reflected wave of a transmission signal on a transmission line, comprising a hybrid circuit coupled to the transmission line and configured to extract the reflected wave of the transmission signal; a control circuit configured to obtain level and time information related to the reflected wave by computing a correlation between a data pattern of the transmission signal and the reflected wave extracted by the hybrid circuit; and a correcting circuit configured to correct a waveform of the transmission signal based on the level and time information related to the reflected wave and obtained by the control circuit.

One aspect is to provide an apparatus, such as a semiconductor device, comprising a signal transmission/reception circuit described above.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments will be described with reference to the accompanying drawings.

According to one aspect, a reflected wave is detected by a hybrid circuit, and a feedback is made to minimize the intensity of the reflected wave. In addition, a correlation between a data pattern and the reflected wave is computed by utilizing the dependency of the reflected wave on the data pattern, and the signal waveform is corrected in order to minimize the correlation.

Information related to the reflected wave is dynamically extracted at a transmitting end or at a receiving end with respect to an arbitrary data pattern.

Accordingly, it is possible to always reduce signal waveform deterioration caused by the reflected wave due to an impedance mismatch even with respect to a dynamic change in a transmission line, and reduce an error rate of the transmitted signal.

A description will now be given of a signal transmission method, a transmission/reception circuit, and an apparatus having such a transmission/reception circuit in each embodiment.

First Embodiment

Figure 1:
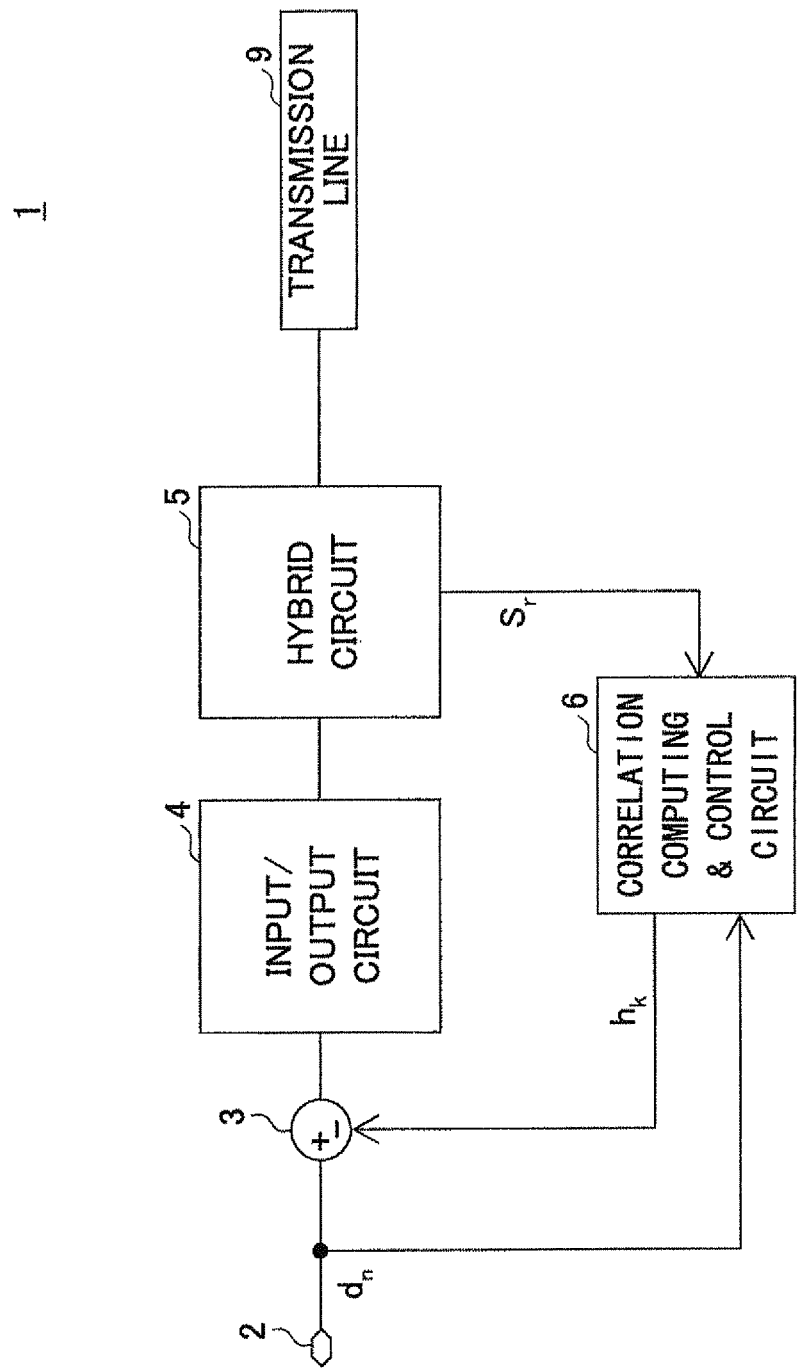
FIG. 1 is a block diagram illustrating a first embodiment.

FIG. 1 is a block diagram illustrating a first embodiment. A transmission/reception circuit 1 illustrated in FIG. 1 includes an input and/or output terminal (hereinafter simply referred to as an input/output terminal) 2, a reflection correcting circuit 3, an input and/or output circuit (hereinafter simply referred to as an input/output circuit) 4, a hybrid circuit 5, and a correlation computing and control circuit 6. When the transmission/reception circuit 1 is a transmitting circuit, a transmitting signal is input to the input/output terminal 2 that forms an input terminal, the input/output circuit 4 forms an input circuit, and the hybrid circuit 5 outputs the transmitting signal to a transmission line 9. On the other hand, when the transmission/reception circuit 1 is a reception circuit, a received signal from the transmission line 9 is input to the hybrid circuit 5, the input/output circuit 4 forms an output circuit, and the received signal is output from the input/output terminal 2 that forms an output terminal.

The hybrid circuit 5 extracts the reflected wave from the transmitting signal which forms a main signal when the transmission/reception circuit 1 forms the transmitting circuit, and extracts the reflected wave from the received signal, which forms a main signal when the transmission/reception circuit 1 forms the reception circuit. For example, the hybrid circuit 5 may be formed by a Gm-R type hybrid circuit which uses a transformer or the like and may require no clock. The Gm-R type hybrid circuit is generally used for bi-directional signal transmissions, and is capable of separating and extracting the reflected wave from the main signal while making the actual data transmission and reception. In addition, the hybrid circuit 5 may have a structure illustrated in FIG. 2.

Figure 2:
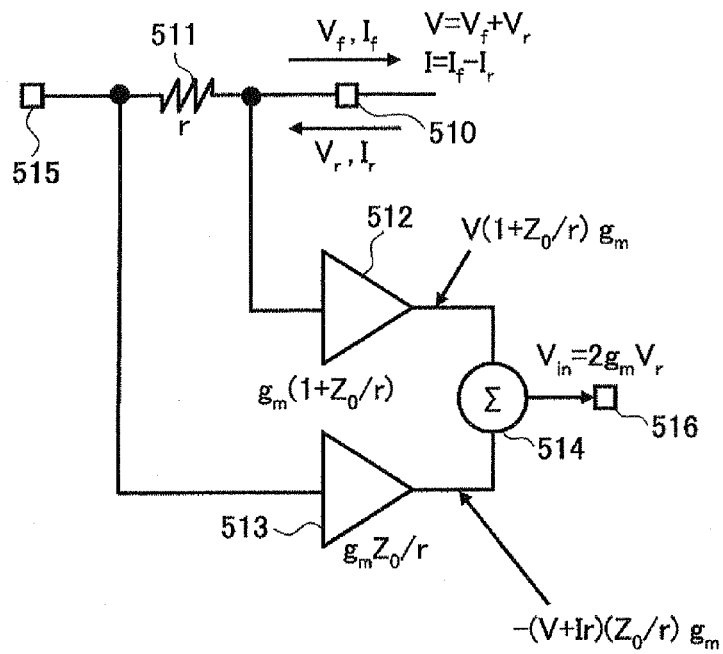
FIG. 2 is a circuit diagram illustrating an example of a structure of a hybrid circuit.

FIG. 2 is a circuit diagram illustrating an example of the structure of the hybrid circuit 5. The hybrid circuit 5 includes terminals 510, 515 and 516, a resistor 511 having a resistance r, amplifier circuits 512 and 513, and an adding circuit 514 which are connected as illustrated in FIG. 2. The terminal 510 is connected to the transmission line 9, the terminal 515 is connected to the input/output circuit 4, and the terminal 516 is connected to the correlation computing and control circuit 6.

In order to match the impedance when viewed from the side of the transmission line 9 towards the side of the input/output circuit 4 to a characteristic impedance $Z_0$ of the transmission line and prevent the reflection and the like of the transmitting signal or the received signal, the impedance of the input/output circuit 4 needs to be $Z_0-r$. However, it is difficult in practice to greatly reduce the impedance of the input/output circuit 4 for the high-speed signal transmission. Thus, if the impedance of the input/output circuit 4 is relatively large, a resistor (not illustrated) may be connected between the output of the input/output circuit 4 and a power supply voltage.

If the voltage and current of the transmitting signal output from the terminal 510 to the transmission line 9 are respectively denoted by $V_f$ and $I_f$ and the voltage and current of the received signal input to the terminal 510 from the transmission line 9 are respectively denoted by $V_r$ and $I_r$, a voltage V and a current I at the terminal 510 may be obtained from the following formulas.

$$V=V_f+V_r$$

$$I=I_f-I_r=(V_f-V_r)/Z_0$$

The voltage $V_r$ may be obtained from the following formula, based on the formulas described above.

$$V_r=(V-Z_0 I)/2$$

If the gain of the amplifier circuit 512 is denoted by $g_m(1+Z_0 I_r)$ and the gain of the amplifier circuit 513 is denoted by $g_m Z_0 I_r$, the output voltage of the amplifier circuit 512 may be obtained from $V(1+Z_0 I_r)g_m$, and the output voltage of the amplifier circuit 513 may be obtained from $-(V+I_r)(Z_0 I_r)g_m$. Hence, the output voltage $V_{in}$ of the adding circuit 514 becomes $V_{in}=2g_m V_r$, and the output voltage $V_{in}$ of the adding circuit 514 becomes proportional with respect to the voltage $V_r$ of the received signal. Consequently, it becomes possible to separate and extract the voltage $V_r$ of the received signal, that is, the reflected wave component, from the transmitting signal.

According to the hybrid circuit 5 illustrated in FIG. 2, it is possible to separate and extract the reflected wave from the signal in which the main signal and the reflected wave are multiplexed, without having to use a replica driver, for example. Compared to the case where the replica driver is used, it is possible to reduce both the power and the area by an amount corresponding to the power and the area required by the replica driver. In addition, the timing adjustment, that is essential when subtracting the output voltage of the replica driver from the main signal on the transmission line 9, may become unnecessary, and the signal transmission speed may be increased with ease.

The transmission/reception circuit 1 may extract the reflected wave with a high accuracy while transmitting or receiving the data. For this reason, unlike the Japanese Laid-Open Patent Publication No. 2004-363861 which requires a special procedure to stop the data transmission or reception, it may be unnecessary to send a limited signal waveform such as a unit pulse in advance in order to extract the reflected wave.

After the reflected wave is extracted by the hybrid circuit 5, the correlation computing and control circuit 6 computes the level (or intensity) and time information of the reflected wave and generates weighting coefficients for making the reflected wave component sufficiently small. The correlation computing and control circuit 6 supplies the weighting coefficients to the reflection correcting circuit 3 to perform a correction in which the reflected wave component is subtracted from the transmitting signal. The level and the time information of the reflected wave are computed by computing the correlation between the reflected wave that is extracted by the hybrid circuit 5 and the data pattern that is transmitted or received. More particularly, the multiplication of each of the values of the past n-bit data of the transmitted or received data to the reflected wave is performed for each clock cycle time or, at arbitrary time intervals. It may be possible to know the extent to which each bit contributes to the reflected wave, by averaging the products that are obtained as a result of the multiplications. In other words, a timing (or phase and cycle time) at which the information related to the reflected wave is computed may be set arbitrarily.

Figure 3:
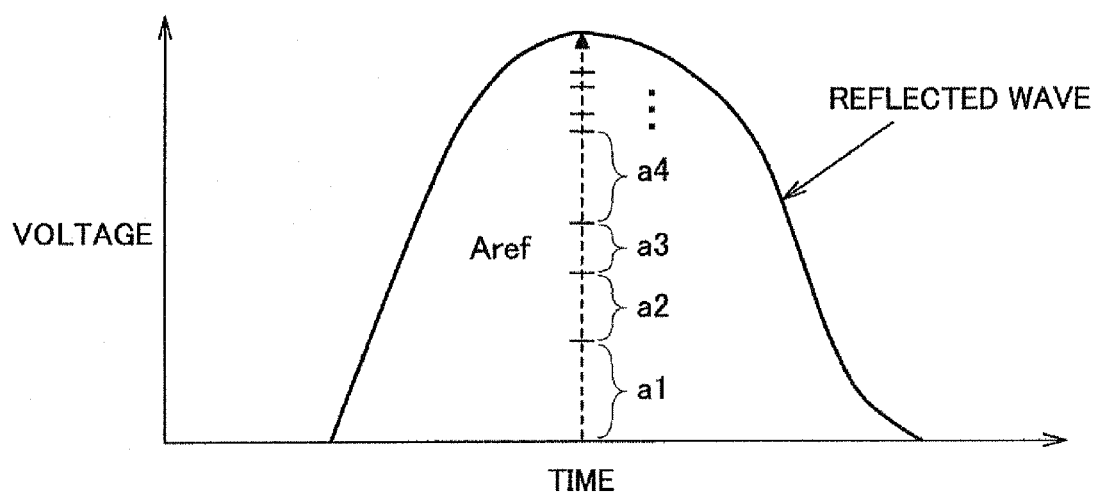
FIG. 3 is a diagram for explaining a correlation computation.

FIG. 3 is a diagram for explaining the correlation computation. FIG. 3 illustrates the reflected wave by a solid line. In FIG. 3, the ordinate indicates the voltage of the reflected wave in arbitrary units, and the abscissa indicates the time in arbitrary units. It is assumed for the sake of convenience that a data stream {di} (i=0, 1, 2, ...) contributes to a reflected wave Aref with a magnitude (or extent) represented by the following formula.

$$Aref=a0*d0+a1*d1+a2*d2+\ldots$$

If it is assumed for the sake of convenience that there is not correlation amongst the data, it may be possible to obtain the contribution (coefficient) in the following manner by obtaining the correlation between the reflected wave Aref and the data di, where $<di\cdot dj>=\delta ij$ (Kronecker's delta ($\delta$) function).

$$<Aref\cdot di>=a0*<d0\cdot di>+a1*<d1\cdot di>+$$
$$a2*<d2\cdot di>+\ldots$$
$$=ai$$

Hence, it may be possible to extract the level information that is reflected to (or influences) the reflected wave Aref and the time information that is reflected to (or influences) subscripts j of the data dj or the like.

It is assumed above that the correlation exists between each bit of the data and the reflected wave. However, in a case where a correlation exists between a bit sequence made up of a plurality of bits and the reflected wave, this correlation between the bit sequence and the reflected wave may be computed. In this case, if the reflected wave is influenced not by the data value itself but by the data transition, the correlation may be computed between $di\cdot d_{i+1}$, in place of the data $d_i$, and the reflected wave. Furthermore, to minimize the reflection in order to reduce the correlation computing time, it is conceivable to suppress the reflection for a given data sequence instead of suppressing the reflection generated for all the data sequences. In this case, it may be possible to provide a unit configured to store correlation values (coefficients) and a unit configured to compare the coefficients, in order to carry out a correction with respect to the data pattern which generates a large reflection.

The waveform-shaping (or reshaping) to minimize the reflection may be carried out in the following manner. That is, the reflected wave is subtracted from the transmitting or received signal in the reflection correcting circuit 3 on the internal circuit side, and not in the input/output circuit 4, in order to minimize the correlation value computed in the correlation computing and control circuit 6. Because a load on the transmission line side of the input/output circuit 4 will not be increased, it may be possible to avoid an increase in the reflection which would otherwise occur due to the impedance mismatch that will occur if the load were increased.

Figure 4:
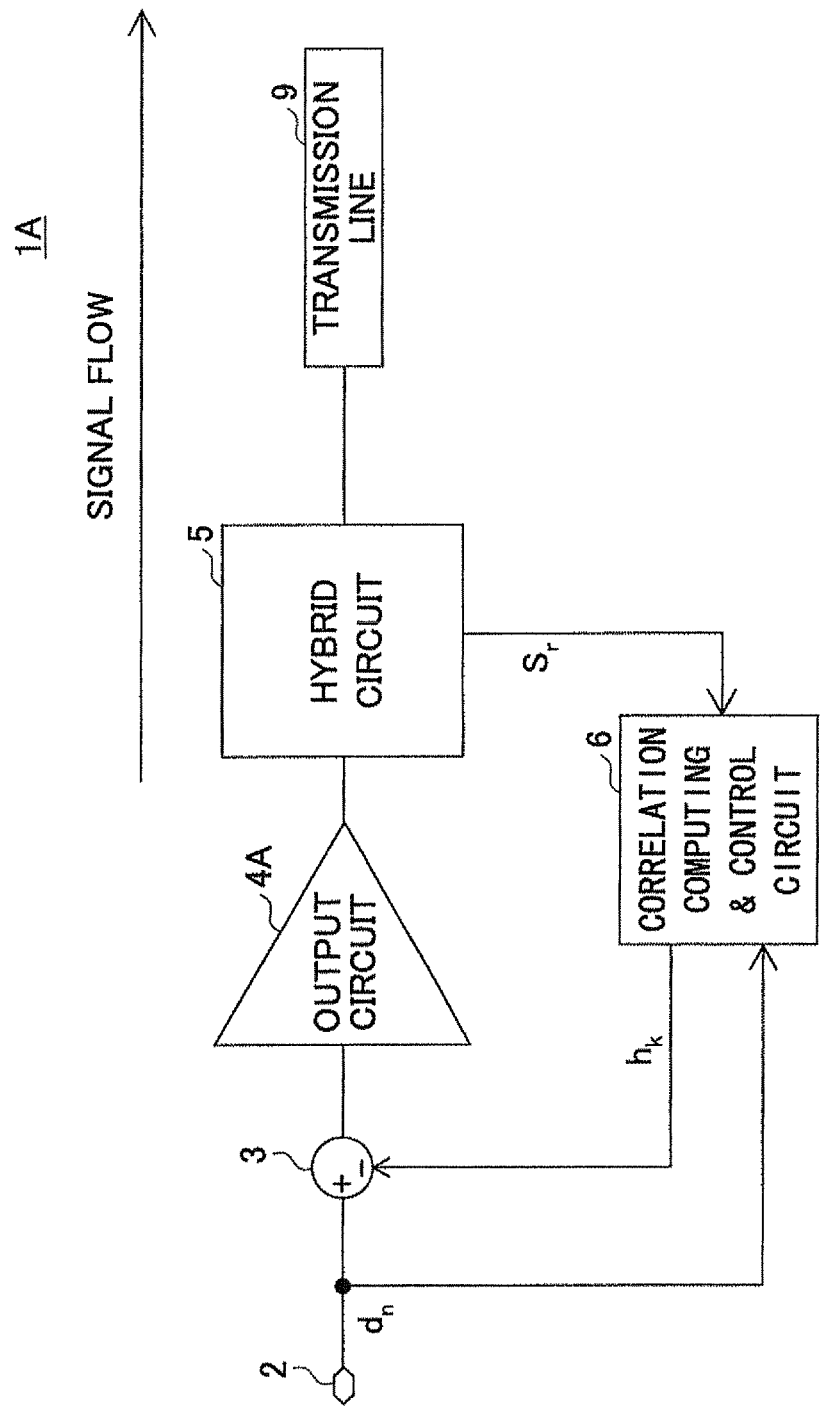
FIG. 4 is a block diagram for explaining a case where the first embodiment is applied to a transmission circuit.

FIG. 4 is a block diagram for explaining a case where the first embodiment is applied to a transmission circuit 1A. In FIG. 4, those parts that are similar to those corresponding parts in FIG. 1 are designated by similar reference numerals, and a description thereof will be omitted. In FIG. 4, an output circuit 4A is connected between the reflection correcting circuit 3 and the hybrid circuit 5.

Figure 5:
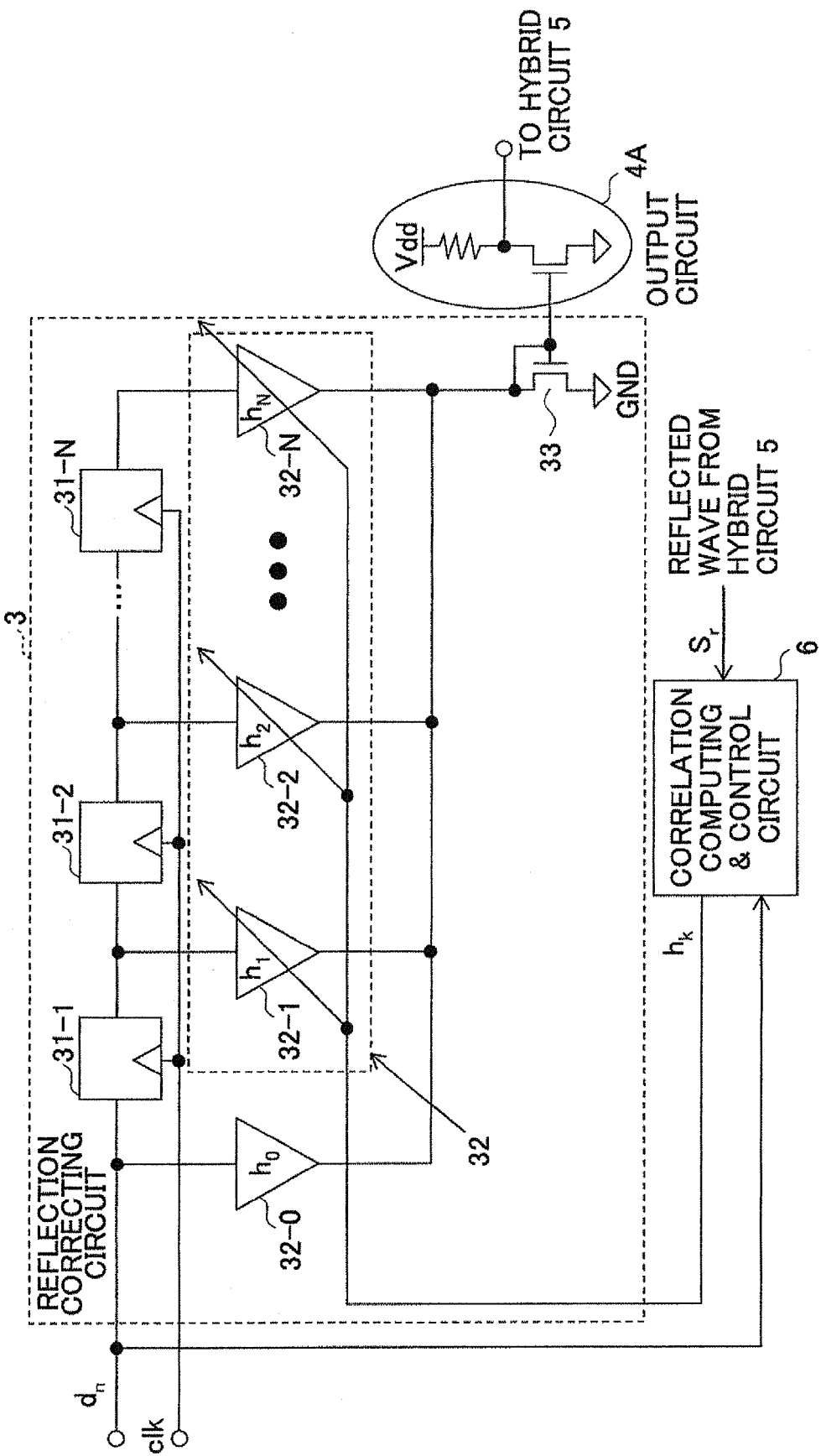
FIG. 5 is a circuit diagram illustrating a structure of a reflection correcting circuit together with an output circuit and a correlation computing and control circuit.

FIG. 5 is a circuit diagram illustrating a structure of the reflection correcting circuit 3 together with the output circuit 4A and the correlation computing and control circuit 6. The reflection correcting circuit 3 includes flip-flops 31-1 through 31-N, weighting circuits 32-0 through 32-N, and an nMOS diode 33 which are connected as illustrated in FIG. 5. The weighting circuits 32-0 through 32-N have a DAC part. In FIG. 5, clk denotes a clock signal, Sr denotes a reflected wave (reflection signal) from the hybrid circuit 5, $h_k$ denotes a weighting coefficient, and GND denotes the ground (or ground voltage).

Figure 6:
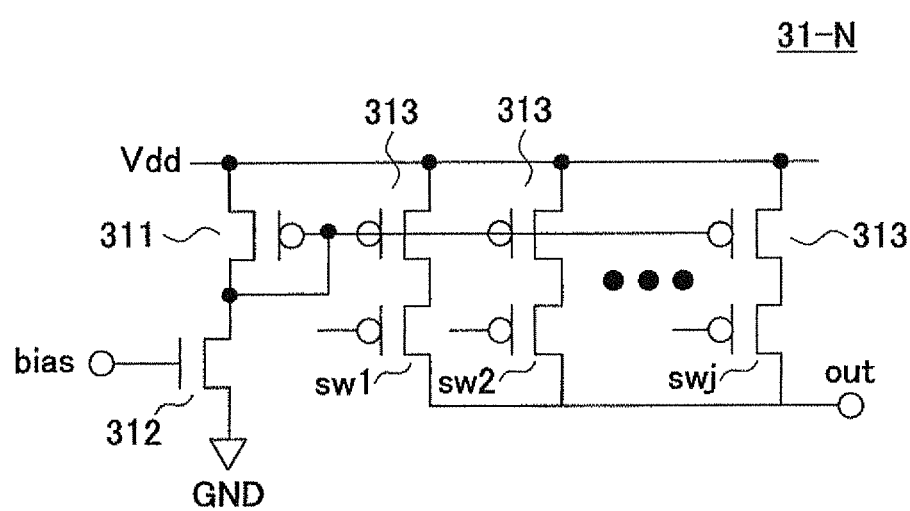
FIG. 6 is a circuit diagram illustrating a structure of a weighting circuit.

FIG. 6 is a circuit diagram illustrating a structure of the weighting circuit 32-N. Because the weighting circuits 32-0 through 32-N–1 may have a structure similar to the structure of the weighting circuit 32-N, illustration and description thereof will be omitted. The weighting circuit 32-N includes transistors 311 through 313, and switching transistors (hereinafter simply referred to as switches) sw1 through swj which are connected as illustrated in FIG. 6. In FIG. 6, Vdd denotes a power supply voltage, bias denotes a bias voltage, GND denotes the ground, and out denotes an output signal of the weighting circuit 32-N.

In the reflection correcting circuit 3, the flip-flops 31-1 through 31-N first hold the past N bits (N is a natural number) of the transmitting signal. The number of bits, N, may be appropriately selected depending on a go-and-return time and the data rate of the transmission line 9. The weighting coefficient $h_k$ which is adjusted by correlation computing and control circuit 6 in order to cancel the reflected wave is weighted and added with respect to the transmitting data. This adding operation is performed by providing a plurality of DACs that may vary an output current thereof by the switch swj, and short-circuiting outputs of the DACs forming the DAC part 32. The added result is subjected to a current-to-voltage conversion in the nMOS diode 33 and then output to the output circuit 4A. The output of the output circuit 4A is output to the hybrid circuit 5. FIG. 5 illustrates an example of the output circuit 4A at the signal end.

Figure 7:
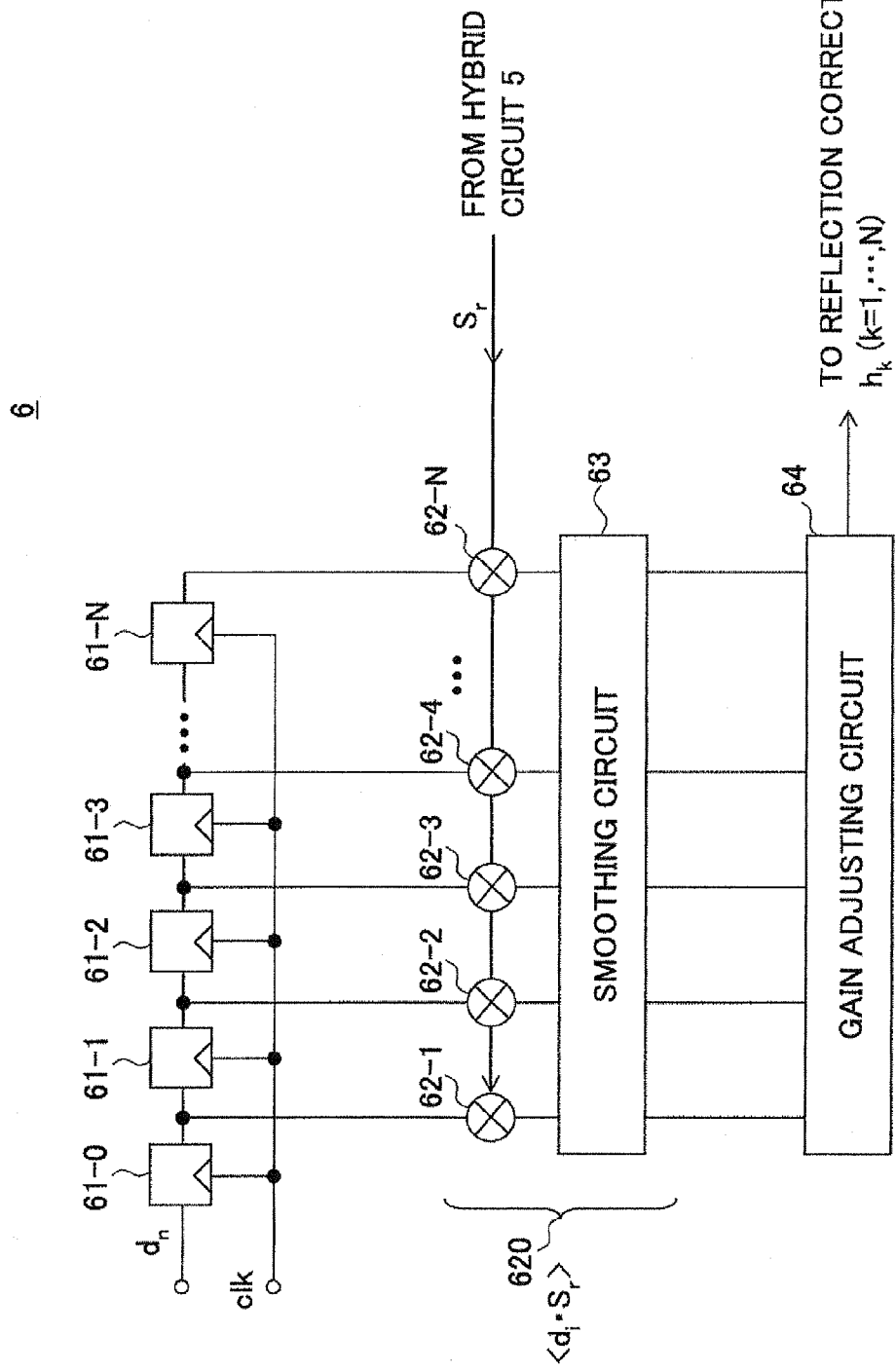
FIG. 7 is a circuit diagram illustrating a structure of the correlation computing and control circuit.

FIG. 7 is a circuit diagram illustrating a structure of the correlation computing and control circuit 6. The correlation computing and control circuit 6 includes flip-flops 61-0 through 61-N (N is a natural number which may be appropriately selected depending on the go-and-return time and the data rate of the transmission line 9, but may be different from the N in FIG. 5), a smoothing circuit part 620, and a gain adjusting circuit 64 which are connected as illustrated in FIG. 7. The smoothing circuit part 620, which obtains a correlation <di·Sr>, includes computing (or operational) circuits 62-1 through 62-N, and a smoothing circuit 63.

When the transmitting data (or serial data) $d_n$ is input to the correlation computing and control circuit 6, the flip-flops 61-0 through 61-N hold a predetermined number of bits (N+1 bits) of the transmitting data $d_n$, similarly to the reflection correcting circuit 3 illustrated in FIG. 5. The correlation between each data bit and the reflection signal Sr output from the hybrid circuit 5 is computed in the corresponding one of the computing circuits 62-1 through 62-N, and the contribution of each data bit to the reflected wave is computed by obtaining the time average (in this embodiment, the moving average) of the correlations in the smoothing circuit 63.

Figure 8:
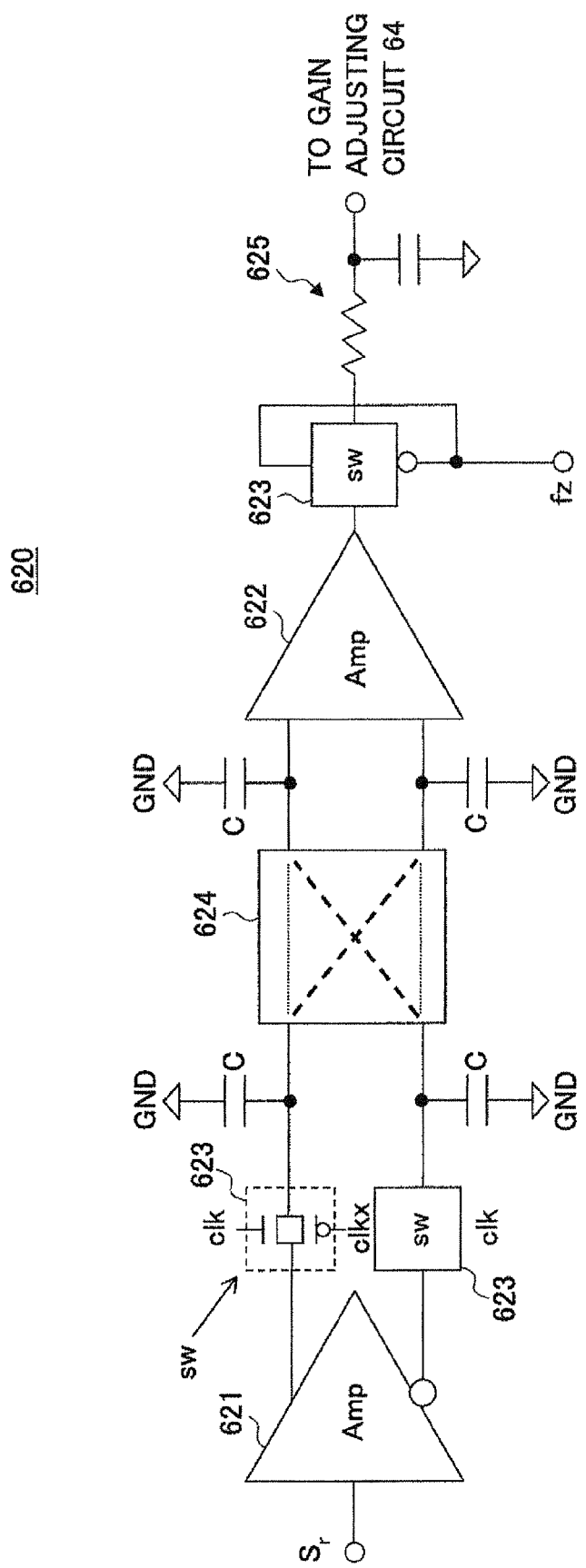
FIG. 8 is a circuit diagram illustrating a structure of a smoothing circuit part.

FIG. 8 is a circuit diagram illustrating a structure of the smoothing circuit part 620 formed by analog circuits. The smoothing circuit part 620 includes amplifier circuits 621 and 622, transfer gate circuits (SWs) 623, capacitors C, a polarity switch 624, and an RC filter 625 which are connected as illustrated in FIG. 8. A differential current output of the amplifier circuit 621 which forms a transconductor (buffer) is sampled by the transfer gate circuits 623 and the capacitors C connected thereto, switched by the polarity switch 624 in response to the value of the binary data, and held in the capacitors C connected to the output side of the polarity switch 624. The polarity switch 624 outputs the data $d_k$ as indicated by a thin broken line if the value of the data $d_k$ is "1", and outputs the data $d_k$ as indicated by a bold broken line if the value of the data $d_k$ is "0". The held data value is supplied to the RC filter 625 via the amplifier circuit 622 and the transfer gate circuit 623 in the output stage, and the RC filter 625 computes the average value of the data values. A signal $f_z$ which indicates whether the weighting coefficient $h_k$ is to be fixed or updated dynamically is input to the transfer gate circuit 623 in the output stage. This signal $f_z$ will be described in conjunction with a second embodiment which will be described later.

Figure 9:
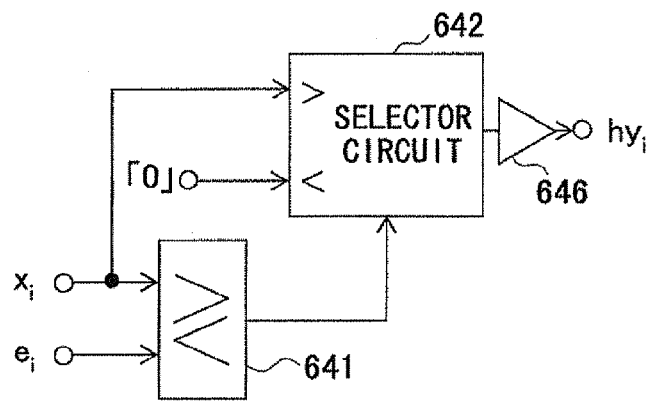
FIG. 9 is a circuit diagram illustrating a structure of a gain adjusting circuit.
Figure 10:
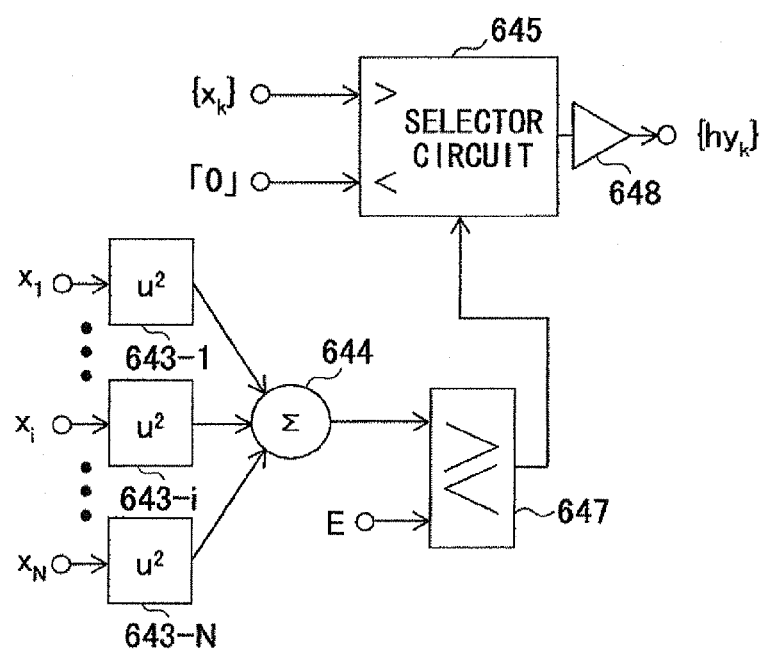
FIG. 10 is a circuit diagram illustrating another structure of the gain adjusting circuit.

FIGS. 9 and 10 are circuit diagrams illustrating structures of the gain adjusting circuit 64. The gain adjusting circuit 64 obtains the weighting coefficient $h_k$ which reduces or minimizes the output of the smoothing circuit 63.

The gain adjusting circuit 64 illustrated in FIG. 9 includes a comparator circuit 641, a selector circuit 642, and an amplifier circuit 646. An output $x_i$ of the smoothing circuit 63 and a threshold value $e_i$ are input to the comparator circuit 641, and an output of the comparator circuit 641 controls the selector circuit 642. The output $x_i$ of the smoothing circuit 63 and a signal having a fixed value, such as "0", are input to the selector circuit 642. The gain of the signal that is selectively output from the selector circuit 642 is adjusted by the amplifier circuit 646 and is output as a weighting coefficient $h_i$. Hence, in the gain adjusting circuit 64 illustrated in FIG. 9, the threshold value $e_i$ is provided with respect to each contribution, and a feedback is made so that each contribution becomes smaller than a certain value.

The gain adjusting circuit 64 illustrated in FIG. 10 includes computing circuits 643-1 through 643-N, a computing circuit 644, a selector circuit 645, a comparator circuit 647, and an amplifier circuit 648. Outputs $x_i$ through $x_N$ of the smoothing circuit 63 are input to the corresponding computing circuits 643-1 through 643-N, and each of the computing circuits 643-1 through 643-N computes a square of the input thereto. The computing circuit 644 obtains a sum of the squares obtained in the computing circuits 643-1 through 643-N, and inputs the sum to the comparator circuit 647. A threshold value E is also input to the comparator circuit 647, and an output of the comparator circuit 647 controls the selector circuit 645. The output $\{x_i\}$ of the smoothing circuit 63 and a signal having a fixed value, such as "0", are input to the selector circuit 645. The gain of the signal that is selectively output from the selector circuit 645 is adjusted by the amplifier circuit 648 and is output as a weighting coefficient $\{h_i\}$. Hence, in the gain adjusting circuit 64 illustrated in FIG. 10, the threshold value E is provided with respect to the sum of the squares of each of the contributions, and a feedback is made in a manner similar to that of the gain adjusting circuit 64 illustrated FIG. 9.

The gain adjusting circuit 64 illustrated in FIG. 9 provides the threshold value in common to or, separately to the absolute value of all of the values of the output of the smoothing circuit 63, and the threshold value $e_i$ is provided with respect to the amplitude of the reflected wave from each bit of the data. The gain adjusting circuit 64 illustrated in FIG. 10 provides the threshold value to the sum of squares of the output of the smoothing circuit 63, and the threshold value E with respect to the sum of the reflected wave energies of all bits of the data. However, the method of providing the threshold value is not limited to those of the gain adjusting circuits 64 illustrated in FIGS. 9 and 10.

Figure 11:
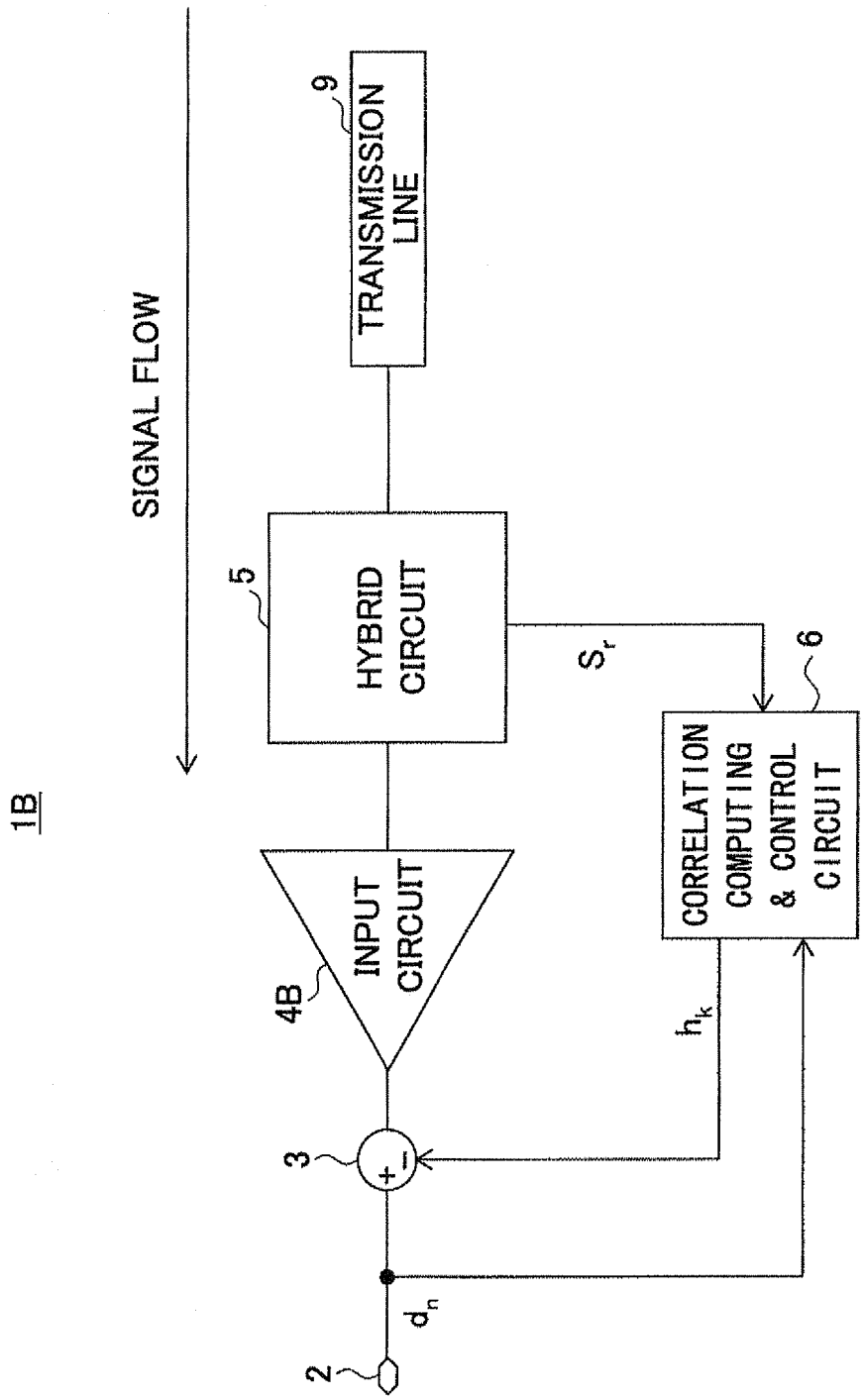
FIG. 11 is a block diagram for explaining a case where the first embodiment is applied to a reception circuit.

FIG. 11 is a block diagram for explaining a case where the first embodiment is applied to a reception circuit. In FIG. 11, those parts that are similar to those corresponding parts in FIG. 1 are designated by similar reference numerals, and a description thereof will be omitted. In FIG. 11, an input circuit 4B is connected between the reflection correcting circuit 3 and the hybrid circuit 5.

The reflected wave may be detected at the receiving end as illustrated in FIG. 11. In this case, the input circuit 4B may be formed by a judging circuit or, an ADS and an equalization circuit. By carrying out a process similar to the above described process carried out at the transmitting end based on the received data obtained by the input circuit 4B, it may be possible to extract the reflected wave component and correct the received signal.

Therefore, according to this embodiment, the reflected wave is detected by the hybrid circuit 5, and a feedback is made in order to minimize the intensity of the reflected wave. In addition, by utilizing the dependency of the reflected wave on the data pattern, the correlation computing and control circuit 6 may compute the correlation between the data pattern and the reflected wave, and the reflection correcting circuit 3 may correct the signal waveform in order to minimize the correlation. The information related to the reflected wave may be dynamically extracted with respect to an arbitrary data pattern, at the transmitting end or at the receiving end. Hence, it may be possible to always reduce the signal waveform deterioration caused by the reflected wave due to the impedance mismatch even with respect to a dynamic change in the transmission line, and reduce the error rate of the transmitted signal.

Second Embodiment

Figure 12:
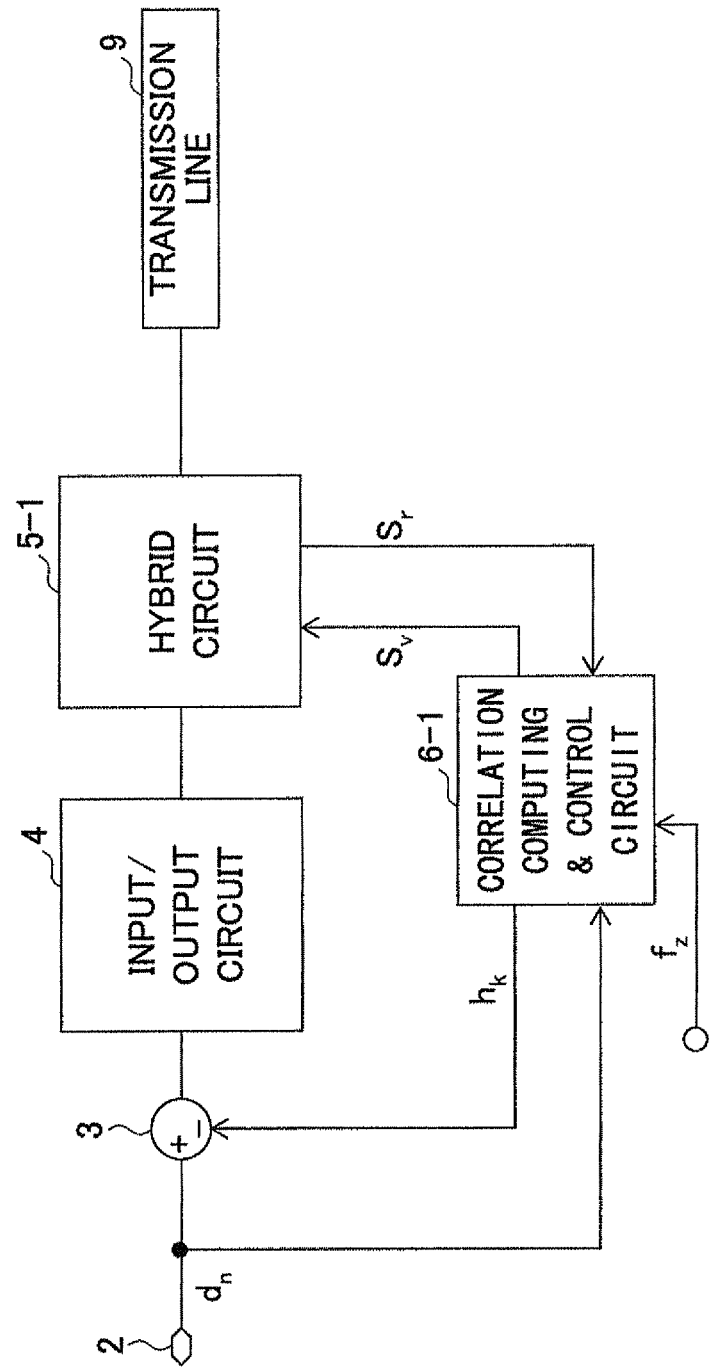
FIG. 12 is a block diagram illustrating a second embodiment.

FIG. 12 is a block diagram illustrating the second embodiment. In FIG. 12, those parts that are similar to those corresponding parts in FIG. 1 are designated by similar reference numerals, and a description thereof will be omitted.

In this embodiment, a hybrid circuit 5-1 basically has the structure illustrated in FIG. 2, except that the resistor 511 is formed by a variable resistor circuit whose resistance may be variably set, unlike the first embodiment. The effects of the reflection may further be reduced by making a feedback with respect to the variable resistor circuit within the hybrid circuit 5-1 in order to minimize the correlation value based on the correlation value computed in a correlation computing and control circuit 6-1.

Figure 13:
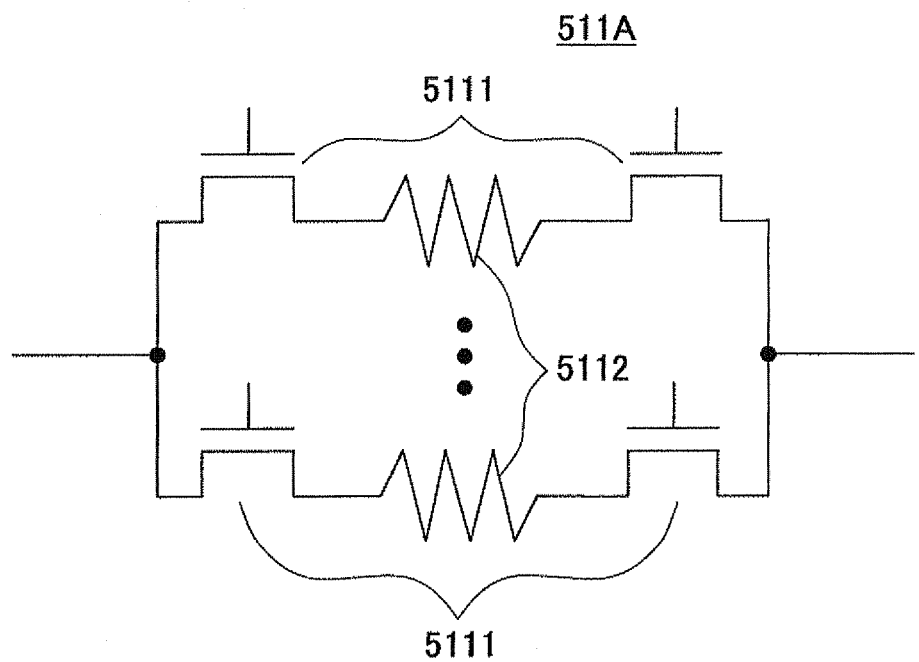
FIG. 13 is a circuit diagram illustrating a structure of a variable resistor circuit.
Figure 14:
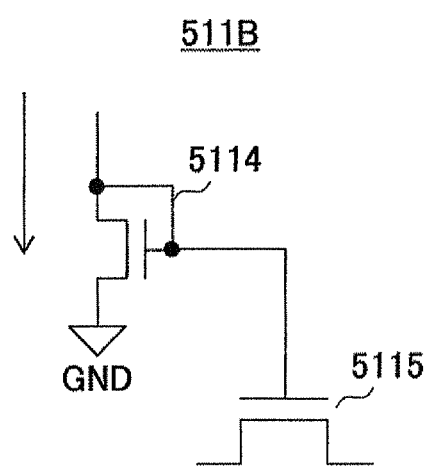
FIG. 14 is a circuit diagram illustrating another structure of the variable resistor circuit.

For example, the variable resistor circuit may have a structure illustrated in FIG. 13 or FIG. 14. FIGS. 13 and 14 are circuit diagrams illustrating structures of the variable resistor circuit. A variable resistor circuit 511A includes a plurality of transistors 5111, and a plurality of resistors 5112 which are connected in parallel and are controlled to a connected state or a disconnected state depending on the switching made by the transistors 5111. A variable resistor circuit 511B illustrated in FIG. 14 includes a transistor 5114, and a transistor 5115 whose gate voltage is controlled by the transistor 5114.

Figure 15:
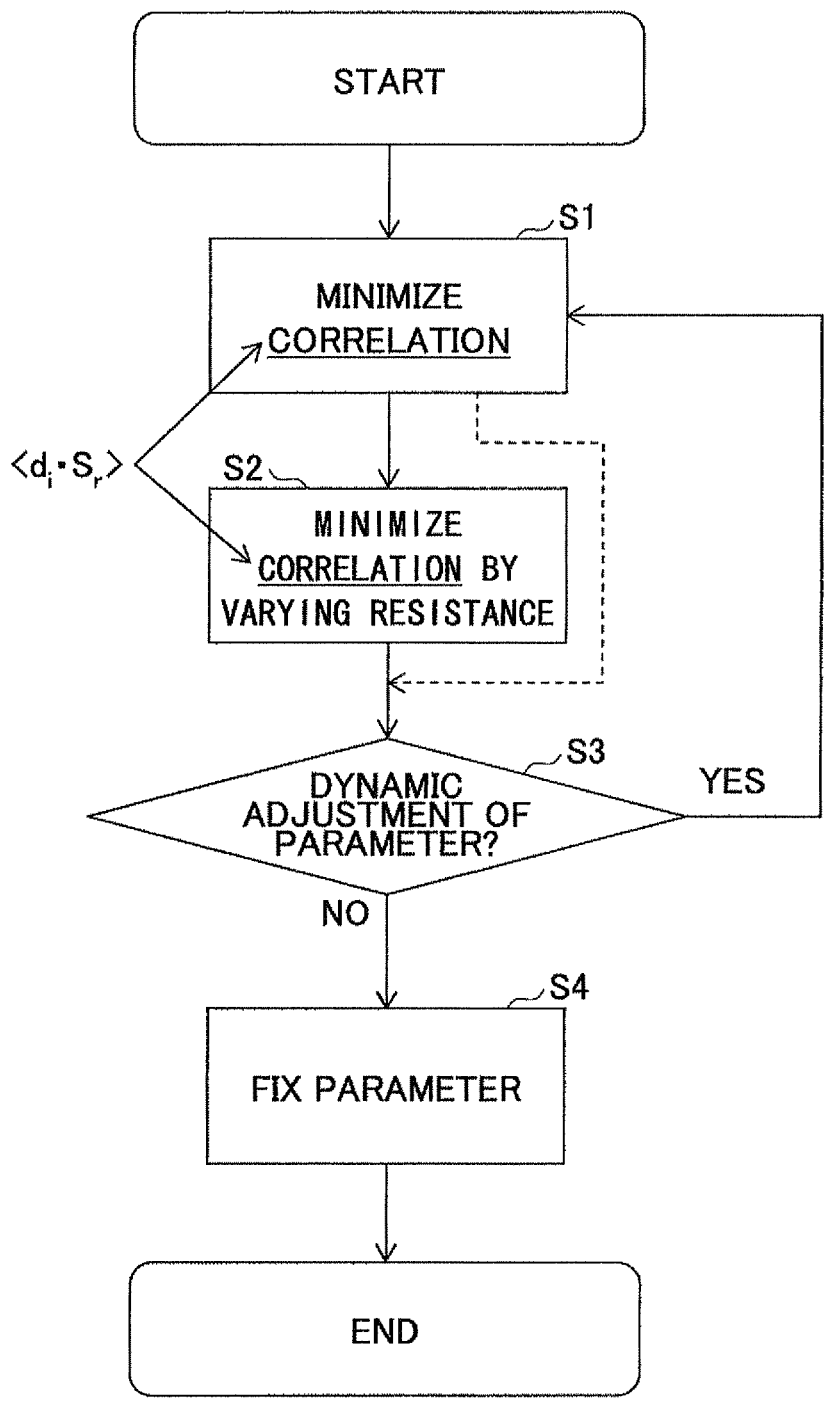
FIG. 15 is a flow chart for explaining a resistance optimizing process.

FIG. 15 is a flow chart for explaining a resistance optimizing process for optimizing the resistance of the variable resistor circuit. In FIG. 15, a step S1 minimizes the correlation value between the pattern of the data $d_n$ and the reflected wave by the correction process of the reflection correcting circuit 3. A step S2 makes a feedback to the hybrid circuit 5-1 (that is, the variable resistor circuit) to minimize the correlation value and to optimize the resistance of the variable resistor circuit, based on the correlation value computed by the correlation computing and control circuit 6-1. A step S3 decides whether or not the mode is for dynamically adjusting the parameter such as the weighting coefficient $h_k$, based on the signal $f_z$, and the process returns to the step S1 if the decision result in the step S3 is YES. On the other hand, if the decision result in the step S3 is NO, a step S4 fixes the parameter in the reflection correcting circuit 3, and the process ends. The value of the signal $f_z$ may be fixed in the correlation computing and control circuit 6-1 depending on a default setting or, may be set arbitrarily.

If the resistance of the resistor 511 within the hybrid circuit 5 is fixed as in the case of the first embodiment described above, the step S2 is omitted as indicated by a bypassing broken line in FIG. 15.

In addition, in a case where the hybrid circuit 5-1 has a structure other than the structure illustrated in FIG. 2, a feedback may be made to the hybrid circuit 5-1 in order to minimize the correlation value based on the correlation value computed in the correlation computing and control circuit 6, to thereby variably control a parameter other than the resistance within the hybrid circuit 5-1 and reduce the effects of the reflection.

Figure 16:
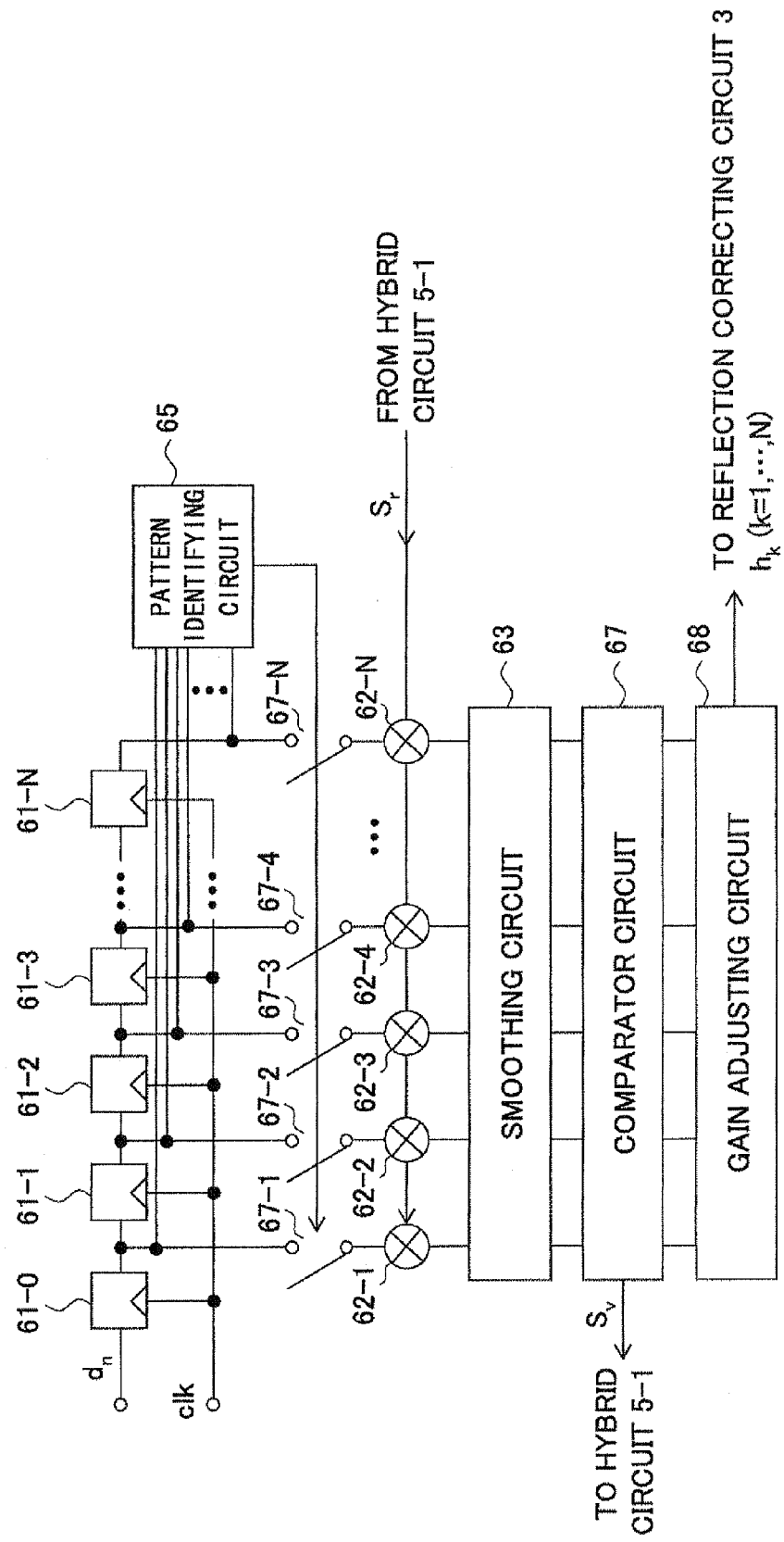
FIG. 16 is a circuit diagram illustrating a structure of a correlation computing and control circuit.

FIG. 16 is a circuit diagram illustrating a structure of the correlation computing and control circuit 6-1. In FIG. 16, those parts that are similar to those corresponding parts in FIG. 7 are designated by similar reference numerals, and a description thereof will be omitted. FIG. 16 illustrates the structure of the correlation computing and control circuit 16 for a case where the reflected wave is evaluated by the data sequence. In addition to the constituent elements illustrated in FIG. 7, the correlation computing and control circuit 6-1 illustrated in FIG. 16 further includes a pattern identifying circuit 65, switching circuits 67-1 through 67-N, a comparator circuit 67, and a gain adjusting circuit 68.

The pattern identifying circuit 65 prestores a fixed data pattern that is anticipated as the reflection becomes relatively large. The pattern identifying circuit 65 closes the switching circuits 67-1 through 67-N when the data pattern prestored in the pattern identifying circuit 65 is input and detected. For example, in a case where the fixed data pattern is a pattern in which a data transition ("0"→"1" or "1"→"0") occurs, the pattern identifying circuit 65 closes the switching circuits 67-1 through 67-N by an exclusive-OR (EXOR) circuit when this fixed pattern is detected in order to compute the weighting coefficient $h_k$.

The comparator circuit 67 and the gain adjusting circuit 68 may be formed by any suitable circuits that compare the output of the smoothing circuit 63 and the threshold value and adjust the gain, and may have a structure similar to that illustrated in FIG. 9 or FIG. 10, for example. The comparator circuit 67 outputs a control signal $S_v$ for controlling the resistance of the variable resistor circuit within the hybrid circuit 5-1 based on a result of the comparison. The gain adjusting circuit 68 outputs the weighting coefficient $h_k$ for controlling the reflection correcting circuit 3.

The structure of the correlation computing and control circuit 6-1 illustrated in FIG. 16 is suited for suppressing the reflection in a case where the transmitting data has a fixed data pattern which causes the reflection to become relatively large. A low power consumption may be achieved by not constantly operating the smoothing circuit 63. In addition, this structure of the correlation computing and control circuit 6-1 is also suited for a case where the reflection having a predetermined level or less is tolerated.

Figure 17:
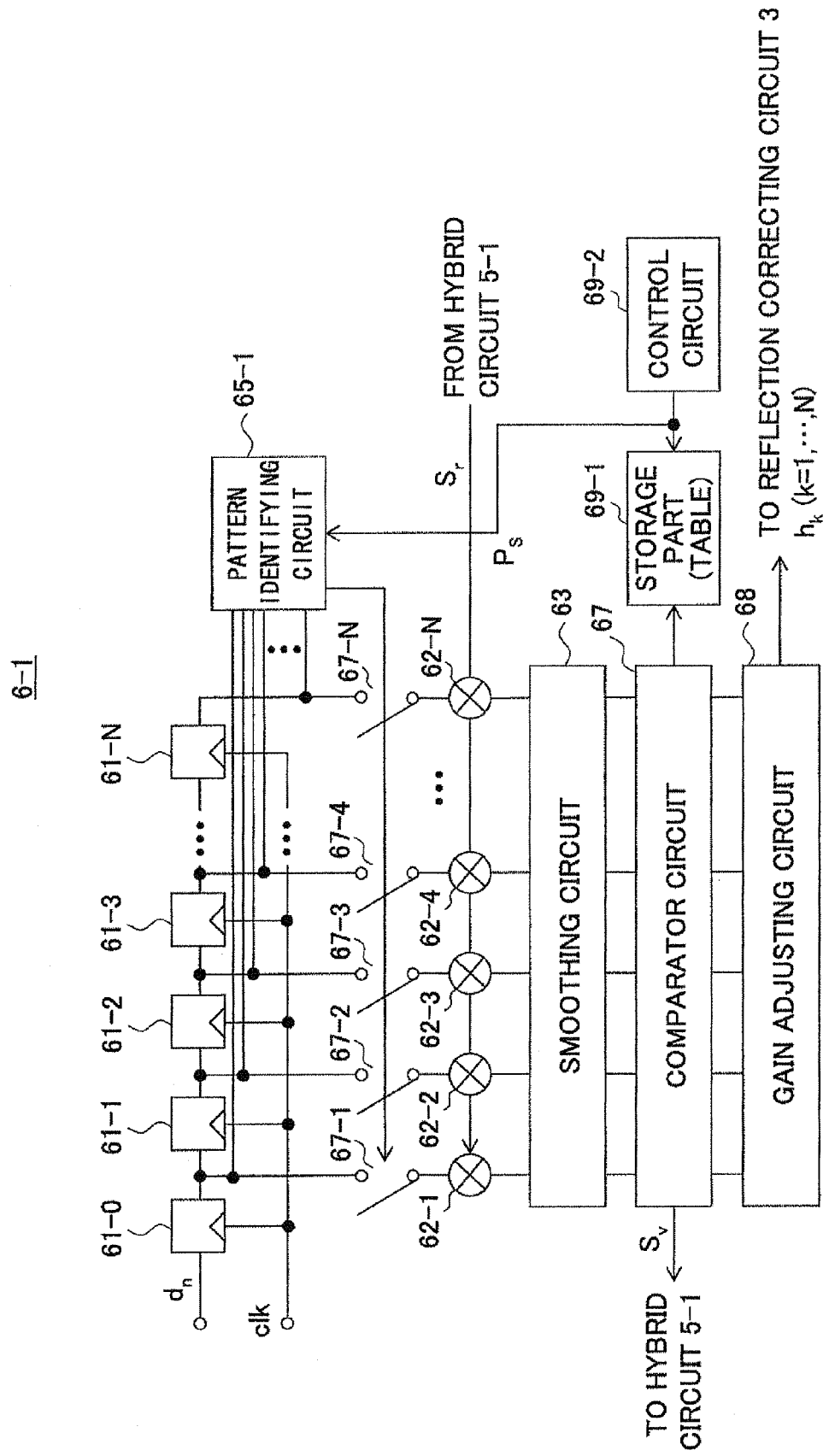
FIG. 17 is a circuit diagram illustrating another structure of the correlation computing and control circuit.

FIG. 17 is a circuit diagram illustrating another structure of the correlation computing and control circuit 6-1. In FIG. 17, those parts that are similar to those corresponding parts in FIG. 16 are designated by similar reference numerals, and a description thereof will be omitted. FIG. 17 illustrates the structure of the correlation computing and control circuit 6-1 for a case where the data pattern which causes the reflection to be relatively large is acquired dynamically. In addition to the constituent elements illustrated in FIG. 16, the correlation computing and control circuit 6-1 illustrated in FIG. 17 further includes a storage part 69-1 and a control circuit 69-2. Moreover, a pattern identifying circuit 65-1 is provided in place of the pattern identifying circuit 65. The storage part 69-1 stores, in a table format, the data pattern obtained for each data sequence and the intensity (or level) of the reflected wave generated for the data pattern, in correspondence with each other. The control circuit 69-2 refers to the table stored in the storage part 69-1 and supplies a data sequence (or data pattern) $P_s$ for measuring the intensity of the reflected wave to the pattern identifying circuit 65-1, in order to determine how the control is to be carried out based on the intensity of the reflected wave. For example, it may be possible to reduce the convergence time of the processing loop for the signal correction, by carrying out the signal correction with respect to the data sequence which generates the reflected wave having the maximum intensity.

The structure of the correlation computing and control circuit 6-1 illustrated in FIG. 17 is suited for dynamically acquiring the data pattern which causes a relatively large reflection of the transmitting data and suppressing the reflection.

Figure 18:
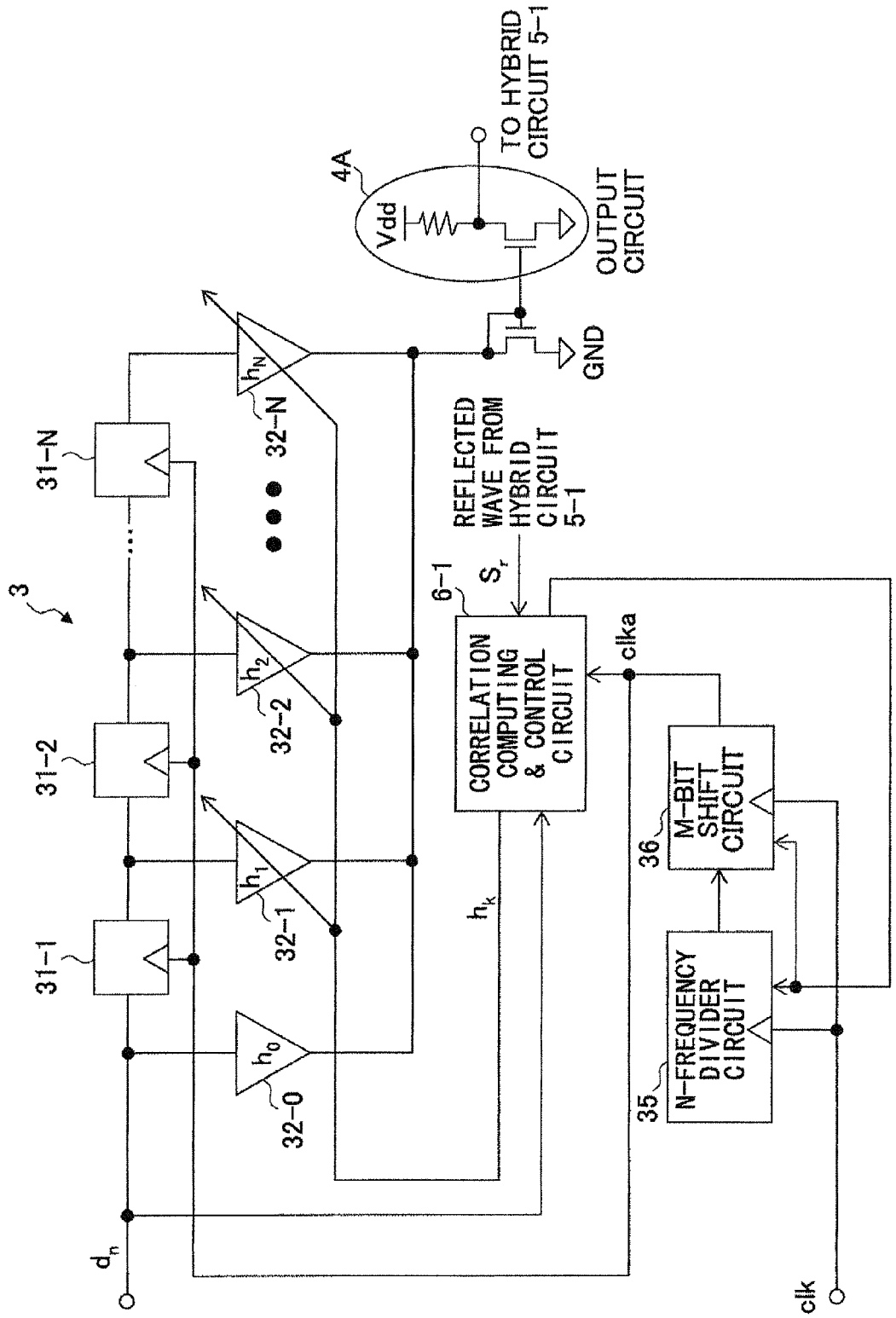
FIG. 18 is a circuit diagram illustrating a structure of a reflection correcting circuit together with an output circuit and the correlation computing and control circuit.

FIG. 18 is a circuit diagram illustrating a structure of the reflection correcting circuit 3 together with the output circuit 4A and the correlation computing and control circuit 6-1. In FIG. 18, those parts that are similar to those corresponding parts in FIG. 5 are designated by similar reference numerals, and a description thereof will be omitted. In addition to the constituent elements illustrated in FIG. 5, the reflection correcting circuit 3 illustrated in FIG. 18 further includes a N-frequency divider circuit 35 and a M-bit shift circuit 36.

The frequency of the clock which drives the flip-flops within the reflection correcting circuit 3 and the correlation computing and control circuit 6-1 may be set identical to or lower than a frequency corresponding to the data rate. In the structure illustrated in FIG. 18, the signal correction may be made with respect to an arbitrary bit by making the phase of the clock variable in units of bits. More particularly, if the operating frequency of the flip-flop is set to 1/N frequency corresponding to the data rate and M is positive integer less than or equal to N−1, the arbitrary bit may be selected at N-bit intervals, and the evaluation and correction of the reflection caused by the arbitrary bit are made in the correlation computing and control circuit 6-1 and the reflection correcting circuit 3. For example, if a limited number of flip-flops are provided due to the limited amount of hardware, the reflection may be corrected with respect to the data transmitted for a relatively long time, by appropriately frequency-dividing the clock clk and selecting the data. In such a case, the clock needs to be common between the reflection correcting circuit 13 and the correlation computing and control circuit 6-1, and thus, the clock clk generated within the reflection correcting circuit 3 in FIG. 18 is supplied to the correlation computing and control circuit 6-1. The N-frequency divider circuit 35 and the M-bit shift circuit 36 may be controlled from the control circuit 69-2 within the correlation computing and control circuit 6-1.

Figure 19:
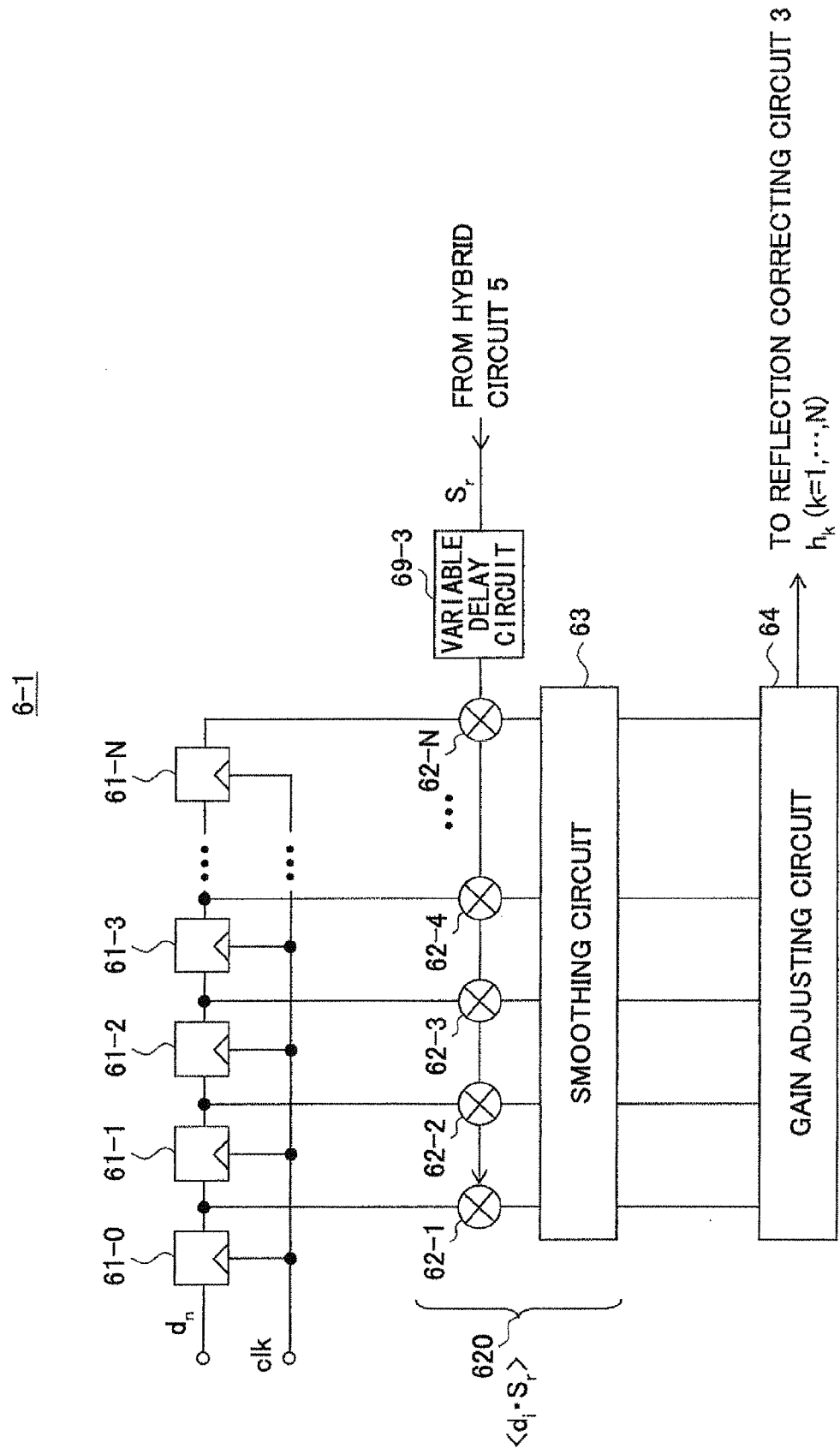
FIG. 19 is a circuit diagram illustrating still another structure of the correlation computing and control circuit.

FIG. 19 is a circuit diagram illustrating still another structure of the correlation computing and control circuit 6-1. In FIG. 19, those parts that are similar to those corresponding parts in FIG. 7 are designated by similar reference numerals, and a description thereof will be omitted. The correlation computing and control circuit 6-1 illustrated in FIG. 19 includes a variable delay circuit 69-3. An amount of delay (or delay time) of the variable delay circuit 69-3 may be variably set in units of time corresponding to 1 bit of data. For this reason, the correlation computing and control circuit 6-1 may extract the information related to the reflected wave for the reflected wave at an arbitrary time.

Figure 20:
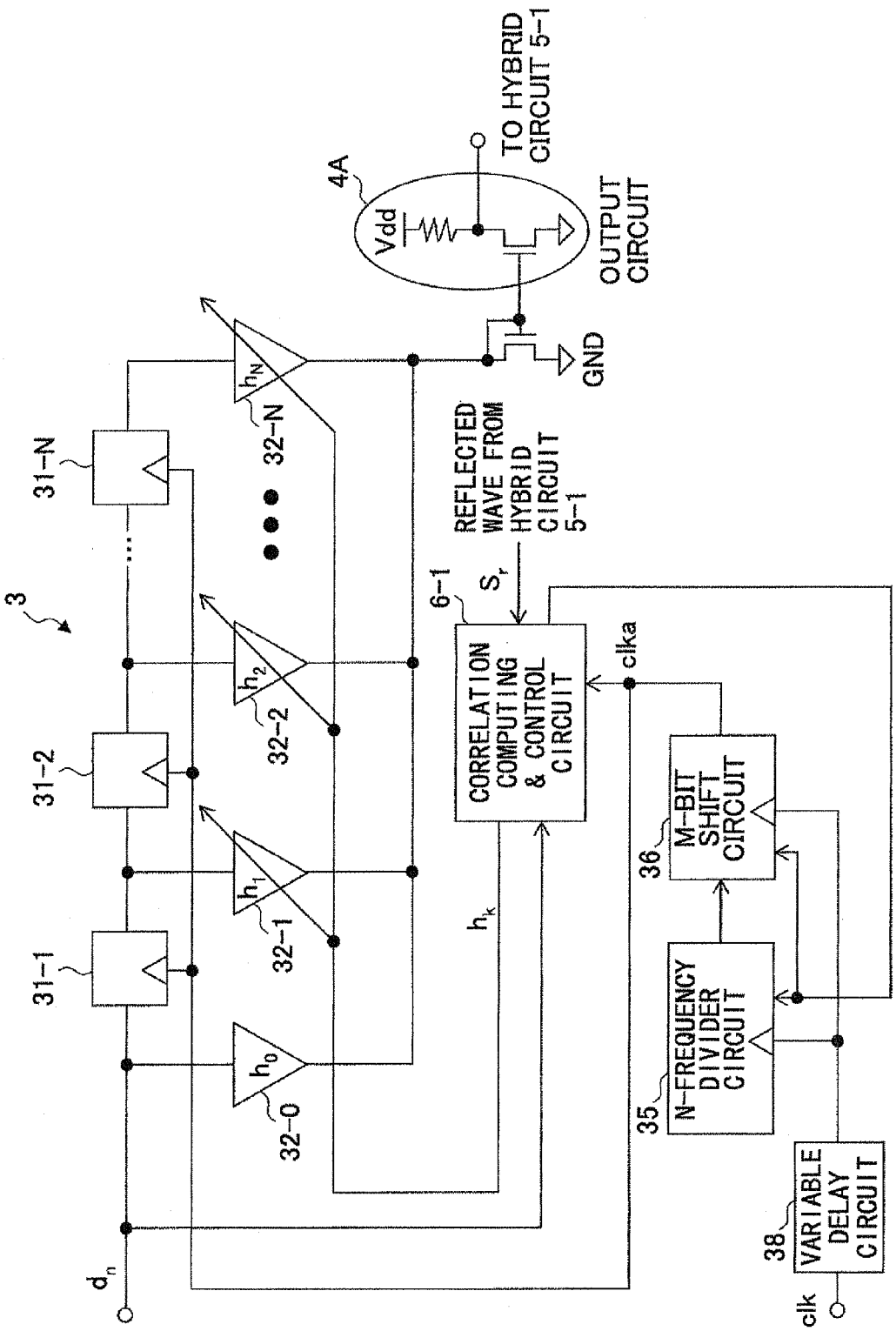
FIG. 20 is a circuit diagram illustrating another structure of the reflection correcting circuit together with the output circuit and the correlation computing and control circuit.

FIG. 20 is a circuit diagram illustrating another structure of the reflection correcting circuit 3 together with the output circuit 4A and the correlation computing and control circuit 6-1. In FIG. 20, those parts that are similar to those corresponding parts in FIG. 18 are designated by similar reference numerals, and a description thereof will be omitted. The reflection correcting circuit 3 illustrated in FIG. 20 includes a variable delay circuit 38 for delaying the clock clk. An amount of delay (or delay time) of the variable delay circuit 38 may be variably set in units of time corresponding to 1 bit of data. For this reason, the correlation computing and control circuit 6-1 may extract the information related to the reflected wave for the reflected wave at an arbitrary time.

The operation for a case where this embodiment is applied to the reception circuit 1B is obvious from the corresponding description above with respect to the first embodiment, and a description thereof will be omitted.

The transmission/reception circuit in each of the embodiments described above may be provided in a router apparatus, a repeater apparatus, an apparatus mounted with a Micro Processing Unit (MPU) or a Central Processing Unit (CPU), and the like. The transmission/reception circuit may thus be integrated within a single-chip semiconductor device or a Multi Chip Module (MCM) forming such an apparatus. In this case, the hybrid circuit may be formed externally to the chip.

Figure 21:
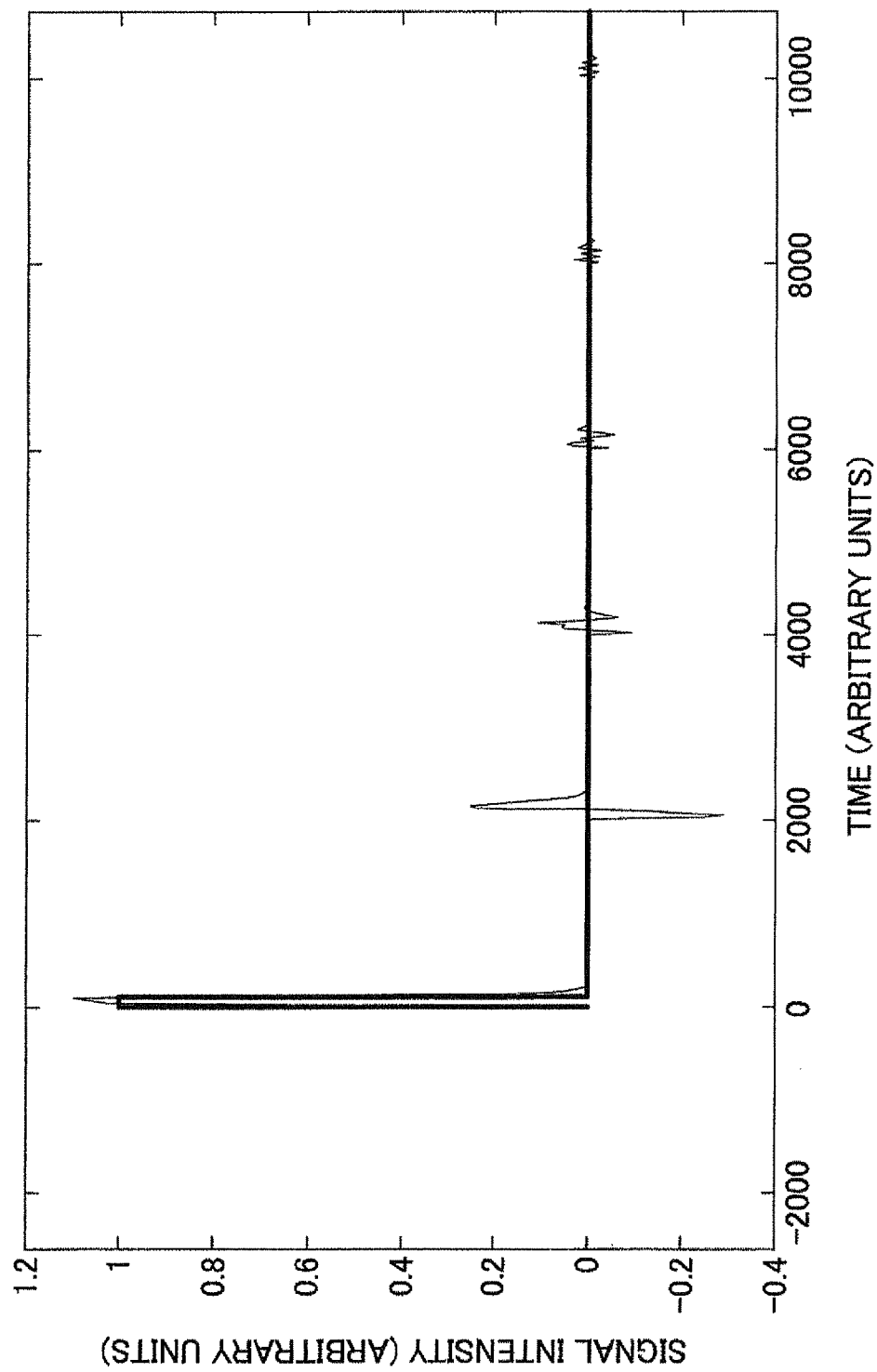
FIG. 21 is a diagram illustrating a unit response of a transmission line.

FIG. 21 is a diagram illustrating a unit response of the transmission line 9. In FIG. 21, the ordinate indicates the signal intensity in arbitrary units, and the abscissa indicates the time in arbitrary units. In FIG. 21 the bold solid line indicates the unit response that is actually measured when no reflection may be generated, and a thin solid line indicates the unit response that is actually measured when the reflection is generated.

Figure 22:
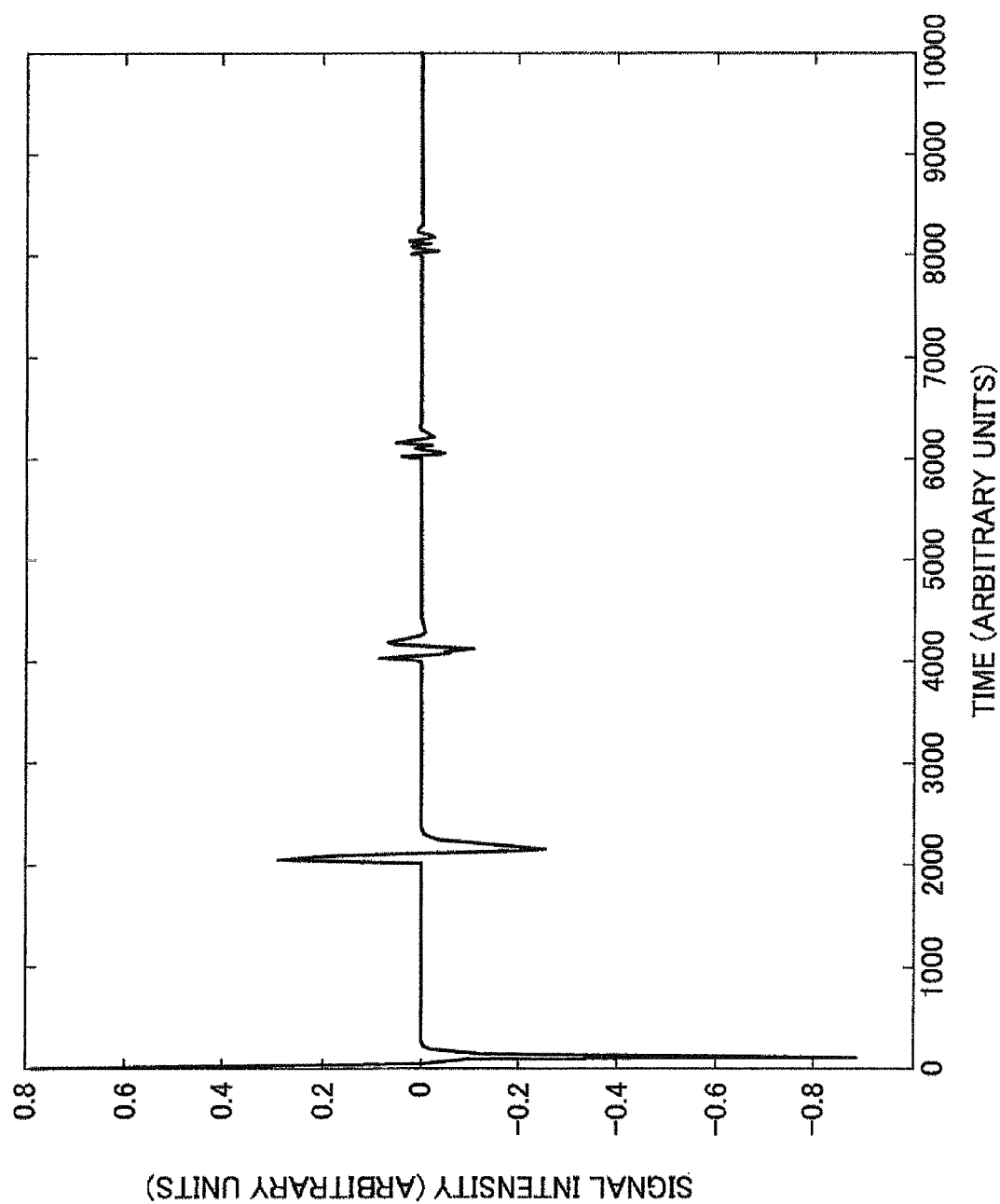
FIG. 22 is a diagram illustrating a correction component for cancelling a reflected wave component.

FIG. 22 is a diagram illustrating a correction component for cancelling the reflected wave component indicated by the thin solid line in FIG. 21. In FIG. 22, the ordinate indicates the signal intensity in arbitrary units, and the abscissa indicates the time in arbitrary units. Ideally, it may be possible to completely eliminate the reflected wave component illustrated in FIG. 21 if the correction component illustrated in FIG. 22 is obtained.

Figure 23:
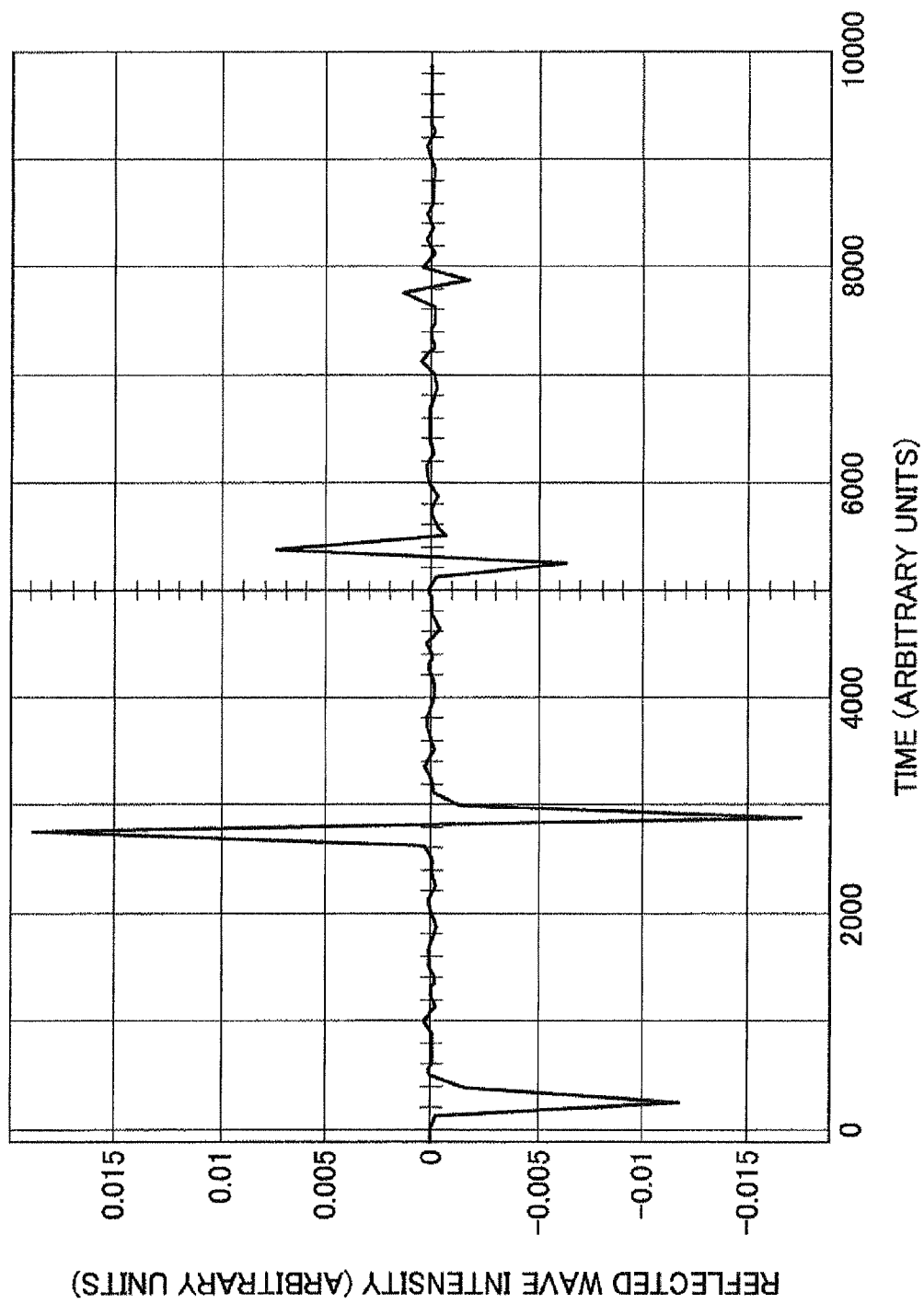
FIG. 23 is a diagram for explaining an evaluation of the reflected wave by the correlation computation.

FIG. 23 is a diagram for explaining an evaluation of the reflected wave by the correlation computation made by the correlation computing and control circuit 6 of the first embodiment described above. In FIG. 23, the ordinate indicates the reflection intensity in arbitrary units, and the abscissa indicates the time in arbitrary units. FIG. 23 illustrates the reflection intensity in a state where the gain of the reflection intensity is adjusted. As may be seen from a comparison of the correlation computation result of FIG. 23 and the ideal reflected wave component of FIG. 22, it was confirmed that the reflected wave component obtained by the correlation computation approximates the ideal reflected wave component.

Figure 24:
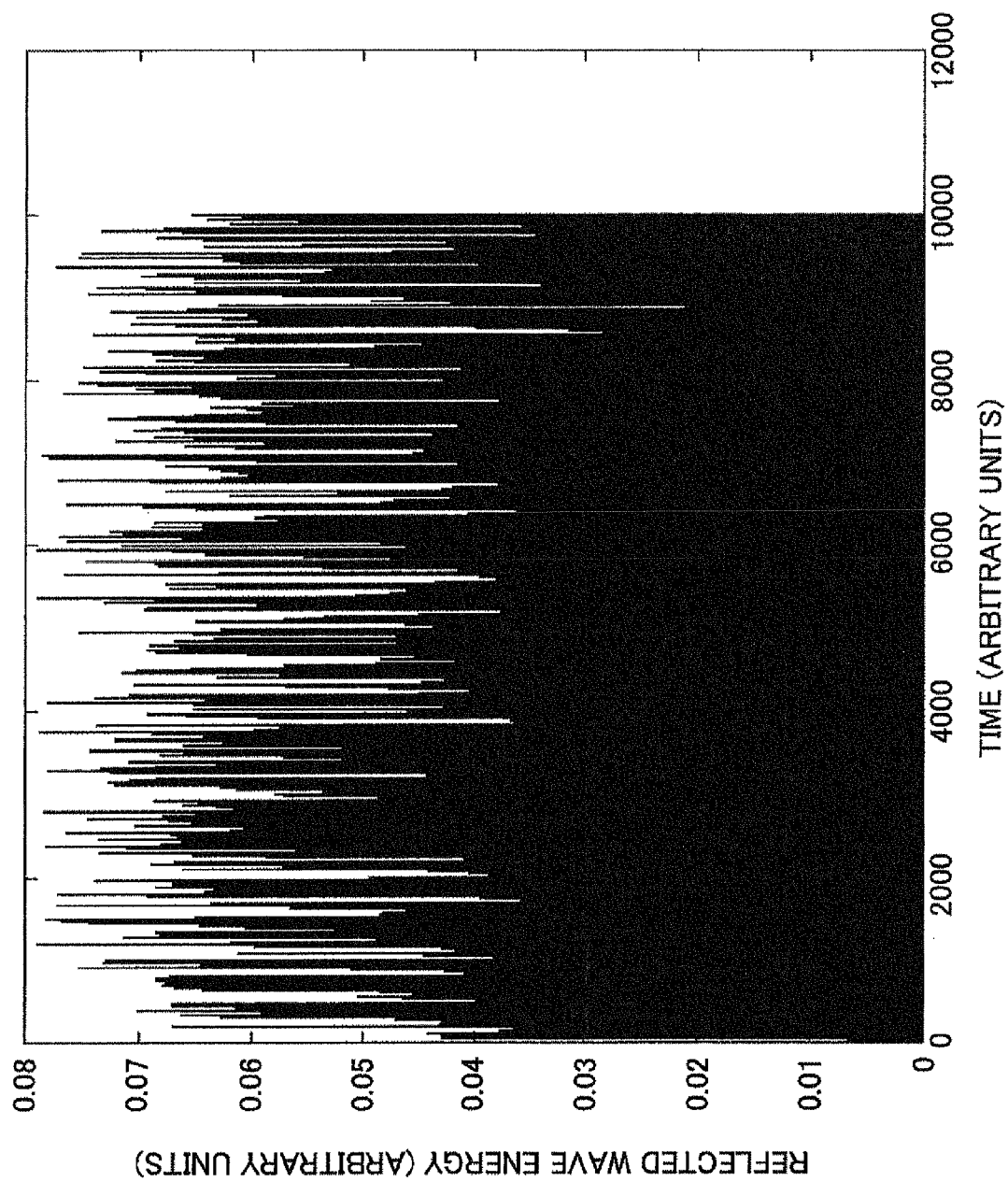
FIG. 24 is a diagram illustrating a reflected wave energy for a case where the reflected wave is not suppressed.
Figure 25:
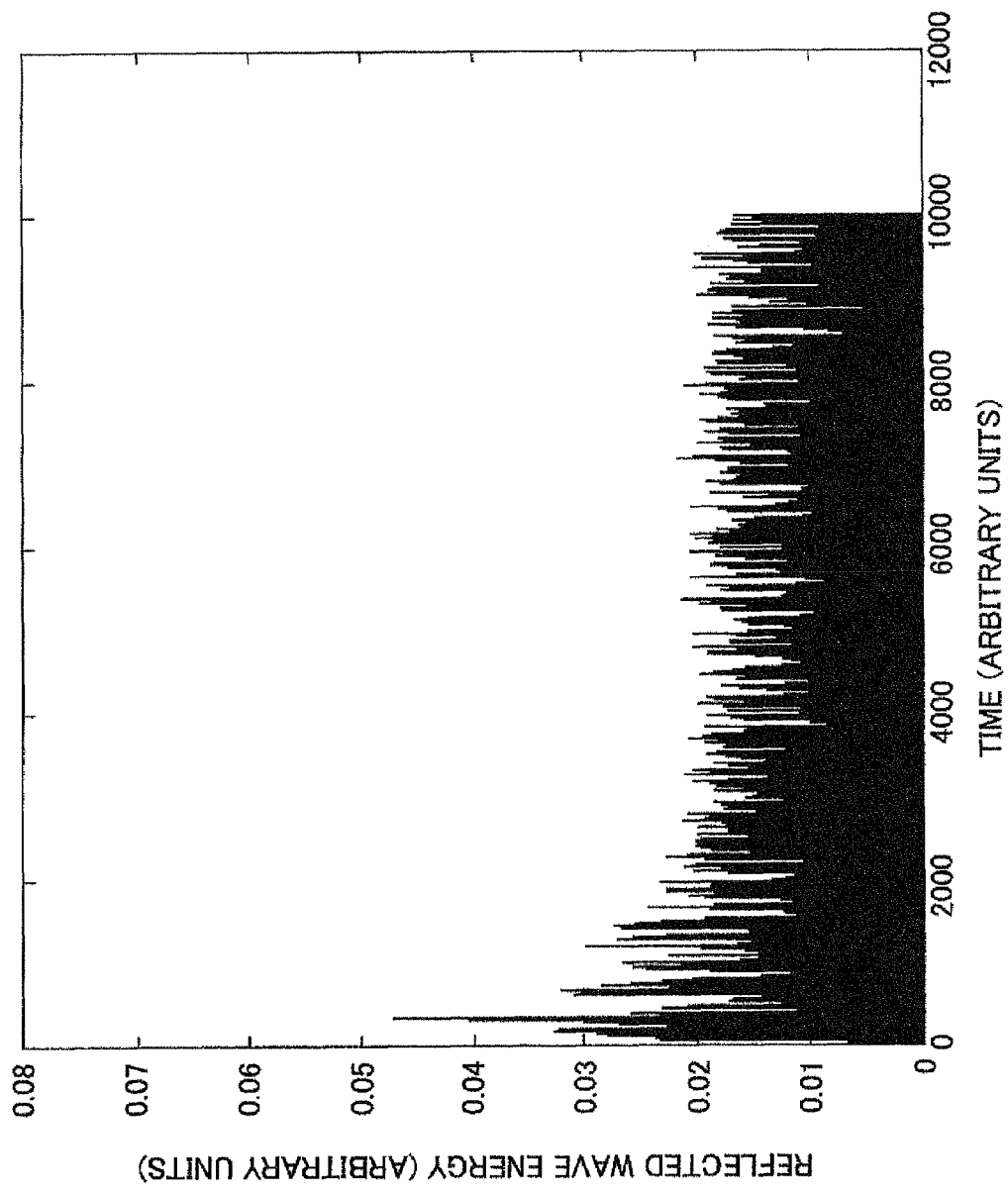
FIG. 25 is a diagram illustrating the reflected wave energy for a case where the reflected wave is suppressed by the first embodiment.

FIG. 24 is a diagram illustrating a reflected wave energy for a case where the reflected wave is not suppressed, and FIG. 25 is a diagram illustrating the reflected wave energy for a case where the reflected wave is suppressed by the first embodiment using the result of the correlation computation illustrated in FIG. 23. In FIGS. 24 and 25, the ordinate indicates the reflected wave (noise) energy in arbitrary units, and the abscissa indicates the time in arbitrary units. As may be seen from a comparison of FIGS. 24 and 25, it was confirmed that the reflected wave energy is suppressed in an extremely satisfactory manner by suppressing the reflected wave using the result of the correlation computation.

The embodiments described above are applicable to signal transmissions among a plurality of circuit blocks within a semiconductor device (or semiconductor chip), signal transmissions among semiconductor chips (or LSI chips), signal transmissions among boards or housings (or casings) mounted on the semiconductor chip, and the like.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal transmission method for suppressing a reflected wave of a transmission signal on a transmitting end of a transmission line, comprising:
    receiving the transmission signal to be transmitted to the transmission line by a terminal;
    extracting the reflected wave by a hybrid circuit that is coupled to the transmission line;
    obtaining, by a control circuit that is coupled to the hybrid circuit and the terminal and receives the reflected wave extracted at the hybrid circuit and the transmission signal received at the terminal, level and time information related to the reflected wave by computing a correlation between a data pattern of the transmission signal received at the terminal and the reflected wave extracted at the hybrid circuit;
    correcting, by a correcting circuit that is coupled to the terminal and the control circuit and receives the transmission signal received at the terminal and the level and time information obtained at the control circuit, a waveform of the transmission signal received at the terminal based on the level and time information obtained at the control circuit in order to minimize the correlation; and
    minimizing the correlation at the control circuit by variably controlling a parameter of the hybrid circuit.

2. The signal transmission method as claimed in claim 1, wherein the correcting corrects the waveform of the transmission signal by the correcting circuit that is coupled to the transmission line via the hybrid circuit.

3. The signal transmission method as claimed in claim 2, wherein the extracting extracts the reflected wave by the hybrid circuit while transmitting or receiving the transmission signal.

4. The signal transmission method as claimed in claim 1, wherein the minimizing dynamically adjusts the parameter when minimizing the correlation.

5. The signal transmission method as claimed in claim 1, comprising:
    computing the correlation when the transmission signal has a predetermined data pattern, when obtaining the level and time information related to the reflected wave.

6. The signal transmission method as claimed in claim 1, wherein
    the obtaining obtains weighting coefficients from the level and time information related to the reflected wave, when obtaining the level and time information related to the reflected wave, and
    the correcting adds the weights to the transmission signal based on the weighting coefficients, when correcting the waveform of the transmission signal.

7. The signal transmission method as claimed in claim 1, wherein the obtaining computes the level and time information related to the reflected wave at an arbitrary timing when obtaining the level and time information related to the reflected wave.

8. A signal transmission circuit for suppressing a reflected wave of a transmission signal on a transmitting end of a transmission line, comprising:
    a terminal configured to receive the transmission signal to be transmitted to the transmission line;
    a hybrid circuit coupled to the transmission line and configured to extract the reflected wave of the transmission signal;
    a control circuit, coupled to the hybrid circuit and the terminal, configured to receive the reflected wave extracted by the hybrid circuit and the transmission signal received by the terminal, and to obtain level and time information related to the reflected wave by computing a correlation between a data pattern of the transmission signal received by the terminal and the reflected wave extracted by the hybrid circuit; and
    a correcting circuit, coupled to the terminal and the control circuit, configured to receive the transmission signal received by the terminal and the level and time information obtained by the control circuit, and to correct a waveform of the transmission signal received by the terminal based on the level and time information obtained by the control circuit in order to minimize the correlation,
    wherein the control circuit minimizes the correlation by variably controlling a parameter of the hybrid circuit.

9. The signal transmission circuit as claimed in claim 8, wherein the correcting circuit is coupled to the transmission line via the hybrid circuit.

10. The signal transmission circuit as claimed in claim 8, wherein the hybrid circuit extracts the reflected wave while transmitting or receiving the transmission signal.

11. The signal transmission circuit as claimed in claim 8, wherein the control circuit dynamically adjusts the parameter.

12. The signal transmission circuit as claimed in claim 8, wherein the control circuit computes the correlation when the transmission signal has a predetermined data pattern.

13. The signal transmission circuit as claimed in claim 8, wherein
the control circuit obtains weighting coefficients from the level and time information related to the reflected wave, and
the correcting circuit adds weight to the transmission signal based on the weighting coefficients.

14. The signal transmission circuit as claimed in claim 8, wherein the control circuit computes the level and time information related to the reflected wave at an arbitrary timing.

15. A semiconductor device comprising:
a signal transmission circuit configured to suppress a reflected wave of a transmission signal on a transmitting end of a transmission line,
the signal transmission circuit including:
a terminal configured to receive the transmission signal to be transmitted to the transmission line;
a hybrid circuit coupled to the transmission line and configured to extract the reflected wave of the transmission signal;
a control circuit, coupled to the hybrid circuit and the terminal, configured to receive the reflected wave extracted by the hybrid circuit and the transmission signal received by the terminal, and to obtain level and time information related to the reflected wave by computing a correlation between a data pattern of the transmission signal received by the terminal and the reflected wave extracted by the hybrid circuit; and
a correcting circuit, coupled to the terminal and the control circuit, and configured to correct a waveform of the transmission signal received by the terminal based on the level and time information obtained by the control circuit in order to minimize the correlation,
wherein the control circuit minimizes the correlation by variably controlling a parameter of the hybrid circuit.

16. The semiconductor device as claimed in claim 15, wherein the correcting circuit is coupled to the transmission line via the hybrid circuit.

17. The semiconductor device as claimed in claim 15, wherein the hybrid circuit extracts the reflected wave while transmitting or receiving the transmission signal.

18. The signal transmission method as claimed in claim 1, wherein the control circuit is coupled between the hybrid circuit and each of the correcting circuit and the terminal.

19. The signal transmission circuit as claimed in claim 8, wherein the control circuit is coupled between the hybrid circuit and each of the correcting circuit and the terminal.

20. The semiconductor device as claimed in claim 15, wherein the control circuit is coupled between the hybrid circuit each of the correcting circuit and the terminal.

* * * * *